United States Patent
Lehmann Madsen et al.

(10) Patent No.: US 11,719,221 B2
(45) Date of Patent: *Aug. 8, 2023

(54) WIND TURBINE BLADE PROVIDED WITH SURFACE MOUNTED DEVICE

(71) Applicant: LM WP PATENT HOLDING A/S, Kolding (DK)

(72) Inventors: Kristian Lehmann Madsen, Fredericia (DK); Jesper Høeg, Kolding (DK); Casper Kildegaard, Kolding (DK); Steven Hauge Pedersen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,506

(22) Filed: Apr. 12, 2022

(65) Prior Publication Data

US 2022/0325691 A1 Oct. 13, 2022

Related U.S. Application Data

(60) Continuation of application No. 17/592,599, filed on Feb. 4, 2022, which is a division of application No.
(Continued)

(30) Foreign Application Priority Data

Aug. 5, 2014 (EP) ..................................... 14179829
Oct. 31, 2014 (GB) ..................................... 1419389

(51) Int. Cl.
*F03D 1/06* (2006.01)

(52) U.S. Cl.
CPC ...... *F03D 1/0641* (2013.01); *F05B 2240/122* (2013.01); *F05B 2240/40* (2013.01);
(Continued)

(58) Field of Classification Search
CPC .............. F03D 1/0641; F05B 2240/122; F05B 2240/40; F05B 2240/3062; F05D 2230/64; F05D 2240/30; Y02E 10/72
See application file for complete search history.

(56) References Cited

U.S. PATENT DOCUMENTS 7,909,576 B1 3/2011 van der Bos et al.
8,182,231 B2 5/2012 Corten et al.
(Continued)

FOREIGN PATENT DOCUMENTS

EP 2 444 658 A1 4/2012
EP 2 484 897 A1 8/2012
(Continued)

OTHER PUBLICATIONS

International Search Report dated Sep. 7, 2015 issued in corresponding International Application No. PCT/EP2015/068043.
MasterBond, Understanding Bond Line Thickness, (Year: 2013).

*Primary Examiner* — Aaron R Eastman
(74) *Attorney, Agent, or Firm* — Nath, Goldberg & Meyer; Tanya E. Harkins

(57) ABSTRACT

A wind turbine blade (10, 610) for a rotor of a wind turbine (2) having a substantially horizontal rotor shaft is described. A surface mounted device (70, 70', 170, 270, 370, 470, 570, 670, 770) is attached to a surface of the wind turbine blade (10). The surface mounted device (70, 70', 170, 270, 370, 470, 570, 670, 770) is attached to the surface of the wind turbine blade (10, 610) via at least a first attachment part (77, 77'), which is connected to a part of the surface mounted device (70, 70', 170, 270, 370, 470, 570, 670, 770). The attachment part (77, 77') comprises a flexible housing (80, 80', 680, 780) that forms a cavity (81, 81', 681, 781) between at least the housing (80, 80', 680, 780) and the surface of the wind turbine blade (10, 610). The cavity (80,
(Continued)

80', 680, 780) is filled with an adhesive that provides an adhesive bonding to the surface of the wind turbine blade (10, 610).

23 Claims, 8 Drawing Sheets

Related U.S. Application Data

15/500,277, filed as application No. PCT/EP2015/068043 on Jan. 30, 2017, now Pat. No. 11,274,651.

(52) U.S. Cl.
CPC ...... *F05D 2230/64* (2013.01); *F05D 2240/30* (2013.01); *Y02E 10/72* (2013.01)

(56) References Cited

U.S. PATENT DOCUMENTS

| | | |
|---|---|---|
| 9,039,381 B2 | 5/2015 | Grife et al. |
| 9,133,816 B2 | 9/2015 | Jensen et al. |
| 9,303,621 B2 | 4/2016 | Fuglsang et al. |
| 9,366,222 B2 | 6/2016 | Nielsen et al. |
| 9,458,821 B2 | 10/2016 | Jacobsen et al. |
| 9,556,849 B2 | 1/2017 | Riddell et al. |
| 10,041,470 B2 | 8/2018 | Ramachandran et al. |
| 10,087,912 B2 | 10/2018 | Tobin et al. |
| 10,145,357 B2 | 12/2018 | Madsen |
| 10,480,483 B2 | 11/2019 | Høeg et al. |
| 10,612,517 B2 | 4/2020 | Herr et al. |
| 2011/0142628 A1 | 6/2011 | Xiong |
| 2012/0100005 A1 | 4/2012 | Oestergaard et al. |
| 2012/0151769 A1 | 6/2012 | Brake et al. |
| 2012/0257978 A1 | 10/2012 | Jensen et al. |
| 2012/0257979 A1 | 10/2012 | Jensen et al. |
| 2012/0269644 A1 | 10/2012 | Enevoldsen et al. |
| 2012/0282105 A1 | 11/2012 | Grife et al. |
| 2013/0045105 A1 | 2/2013 | Driver et al. |
| 2013/0108457 A1 | 5/2013 | Thrue et al. |
| 2014/0328692 A1 | 11/2014 | Riddell et al. |
| 2017/0016426 A1 | 1/2017 | Kuhn |
| 2017/0314531 A1 | 11/2017 | Madsen et al. |
| 2018/0038342 A1 | 2/2018 | Tobin et al. |
| 2018/0258912 A1 | 9/2018 | Herr et al. |
| 2019/0309726 A1 | 10/2019 | Rasmussen et al. |
| 2019/0383262 A1 | 12/2019 | Van Kalken |

FOREIGN PATENT DOCUMENTS

| | | |
|---|---|---|
| EP | 2 532 510 A1 | 12/2012 |
| WO | 02/08600 A1 | 6/2001 |
| WO | 2007/045244 A1 | 4/2007 |
| WO | 2007/065434 A1 | 6/2007 |
| WO | 2007/118581 A1 | 10/2007 |
| WO | 2011/042527 A1 | 4/2011 |
| WO | 2012019655 A1 | 2/2012 |

WIND TURBINE BLADE PROVIDED WITH SURFACE MOUNTED DEVICE

CROSS-REFERENCE TO RELATED APPLICATIONS

This application is a continuation application of U.S. application Ser. No. 17/592,599, filed on Feb. 4, 2022, which is a divisional application of U.S. application Ser. No. 15/500,277, filed on Jan. 30, 2017, presently pending, which was filed as a National Phase Application filed under 35 U.S.C. § 371 as a national stage of PCT/EP2015/068043, filed on Aug. 5, 2015, which claimed the benefit of European Application No. 14179829.8, filed on Aug. 5, 2014, and United Kingdom Application No. 1419389.0, filed on Oct. 31, 2014, the content of each of which is hereby incorporated by reference in its entirety.

TECHNICAL FIELD

The invention relates to a wind turbine blade provided with a surface mounted device, and a method of attaching a device to a surface of a wind turbine blade.

BACKGROUND ART

Ideally, a wind turbine blade of the airfoil type is shaped similar to the profile of an aeroplane wing, where the chord plane width of the blade as well as the first derivative thereof increase continuously with decreasing distance from the hub. This results in the blade ideally being comparatively wide in the vicinity of the hub. This again results in problems when having to mount the blade to the hub, and, moreover, this causes great loads during operation of the blade, such as storm loads, due to the large surface area of the blade.

Therefore, over the years, the construction of blades has developed towards a shape, where the blade consists of a root region closest to the hub, an airfoil region comprising a lift-generating profile furthest away from the hub and a transition region between the root region and the airfoil region. The airfoil region has an ideal or almost ideal blade shape with respect to generating lift, whereas the root region has a substantially circular cross-section, which reduces the storm loads and makes it easier and safer to mount the blade to the hub. The root region diameter is preferably constant along the entire root region. Due to the circular cross-section, the root region does not contribute to the energy production of the wind turbine and, in fact, lowers this a little because of drag. As it is suggested by the name, the transition region has a shape gradually changing from the circular shape of the root region to the airfoil profile of the airfoil region. Typically, the width of the blade in the transition region increases substantially linearly with increasing distance from the hub.

As for instance blades for wind turbines have become bigger and bigger in the course of time, and they may now be more than 60 meters long, the demand for optimised aerodynamic performance has increased. The wind turbine blades are designed to have an operational lifetime of at least 20 years. Therefore, even small changes to the overall performance of the blade may over the lifetime of a wind turbine blade accumulate to a high increase in financial gains, which surpasses the additional manufacturing costs relating to such changes. For many years, the focus areas for research have been directed towards improving the airfoil region of the blade, but during the recent few years, more and more focus has been directed towards also improving the aerodynamic performance of the root and transition regions of the blade.

WO2007/065434 discloses a blade wherein the root region is provided with indentations and/or projections in order to decrease the drag from this part of the blade.

WO2007/045244 discloses a blade, wherein the root region and the transition region are designed so as to have at least two separate airfoil profiles in order to increase the lift of these regions.

WO0208600 describes a wind turbine, where the output of the wind turbine is increased by providing the root section of a wind turbine with a member that is designed in such a way that the assembly consisting of the member and the root section can absorb wind energy and increases the overall efficiency of the wind turbine.

WO2007/118581 discloses a blade, where the inboard part of the blade is provided with a flow guiding device on the pressure side of the blade in order to increase the aerodynamic performance of the blade by increasing the lift. However, the design proposed is very rigid due to the triangular shaped cross-section and consequently the flow guiding device has a tendency to separate from the surface of the blade, when the blade bends.

WO2011/042527 discloses a wind turbine blade provided with a plurality of flow guiding device parts attached to the pressure side of the blade. The longitudinally extending flow guiding parts are grouped together to form a first flow guiding device group in the transition region of the blade. The modular construction of the flow guiding device makes the construction more flexible and reduces peel forces at the ends of the flow guiding device parts. However, the flow guiding device parts are designed with a base part and a protruding plate-shaped element, and loads are still to a large degree transferred to the plate-shaped element, when the blade bends.

Further, state of the art methods of attaching devices to the surface of a wind turbine blade are tedious and complicated. The previous surface attachment techniques have required grinding of gelcoat to reveal fibre material for bonding, applying of adhesive, positioning of the device, removal of excess adhesive, and finally post-treatment, such as painting, for surface visual purposes, thus involving a large number of steps and tools for carrying out the method.

SUMMARY OF THE INVENTION

It is an object of the invention to obtain a new blade and method of attaching devices to the surface of a wind turbine blade, and which overcome or ameliorate at least one of the disadvantages of the prior art or which provide a useful alternative.

According to a first aspect, the invention provides a wind turbine blade for a rotor of a wind turbine having a substantially horizontal rotor shaft, said rotor comprising a hub, from which the wind turbine blade extends substantially in a radial direction when mounted to the hub, the wind turbine blade having a longitudinal direction with a tip end and a root end and a transverse direction. The wind turbine blade further comprises: a profiled contour including a pressure side and a suction side, as well as a leading edge and a trailing edge with a chord having a chord length extending there between, the profiled contour, when being impacted by an incident airflow, generating a lift, wherein a surface mounted device is attached to a surface of the wind turbine blade, wherein the surface mounted device is attached to the surface of the wind turbine blade via at least a first attachment part, which is connected to a part of the surface mounted device. The attachment part comprises a flexible housing that forms a cavity between at least the housing and the surface of the wind turbine blade, and the cavity is filled with an adhesive that provides an adhesive bonding to the surface of the wind turbine blade.

Equivalently, the first aspect of the invention provides a flow guiding device, which is adapted to be attached to the surface of a wind turbine blade, via at least a first attachment part, wherein the attachment part comprises a flexible housing that is adapted to form a cavity between at least the housing and the surface of the wind turbine blade, the cavity being adapted to be filled with an adhesive that provides an adhesive bonding to the surface of the wind turbine blade.

This provides a particular advantageous embodiment with a relative discrete or soft attachment to the surface of the blade, such that loads from the blade, e.g. from bending of the blade or ovalisation of the blade shell, do not transfer up into the surface mounted device itself. Thus, the attachment at discrete parts of the surface mounted device provides an embodiment, which is less likely to be damaged or detached from the surface of the blade. Further, the attachment part with a glue cavity also provides a particular simple method of attaching the surface mounted device to the surface of the blade. Since the housing of the attachment part is flexible, the attachment part may accommodate to the curvature of the blade surface, e.g. by applying pressure to the attachment part. Thereby, the attachment provides a simple method of fitting the add-ons to the surface of the blade without the need of fixtures and lengthy preparation of the surface of blade. Accordingly, a worker may more quickly attach the surface mounted device to the surface of the blade.

The adhesive is preferably a hardened or cured adhesive.

It is clear that the surface mounted device is preferably attached to an external surface of the wind turbine blade. However, it may also be an internal surface of the wind turbine blade.

The housing of the attachment part is seen to form a glue shaper or glue shoe, which may be used for attaching add-ons to the surface of the blade. The housing or attachment part may be provided with glue spacers, e.g. formed as protrusions extending from the roof of the cavity in order to ensure a controlled thickness of the adhesive bond.

The glue cavity may be formed between the flexible housing, the surface of the wind turbine blade and a part of the surface mounted device. It may also be provided as a separate socket for screw mounting the surface mounted device to the surface of the blade.

The attachment part is preferably connected to a proximal part of the surface mounted device. The proximal part of the surface mounted device is the part, which is located nearest the blade surface and so to speak is attached to the surface of the blade. However, by utilising the attachment parts, it is clear that there may be a spacing between the proximal part of the surface mounted device and the surface of the blade.

The adhesive may for instance be PU-based, epoxy-based or MMA.

It is clear that the surface mounted device also comprises a distal part, which is the part farthest from the surface the blade and attachment part.

According to a second aspect, the invention also provides: a wind turbine blade for a rotor of a wind turbine having a substantially horizontal rotor shaft, said rotor comprising a hub, from which the wind turbine blade extends substantially in a radial direction when mounted to the hub, the wind turbine blade having a longitudinal direction with a tip end and a root end and a transverse direction, the wind turbine blade further comprising: a profiled contour including a pressure side and a suction side, as well as a leading edge and a trailing edge with a chord having a chord length extending there between, the profiled contour, when being impacted by an incident airflow, generating a lift, wherein a surface mounted device is attached to a surface of the wind turbine blade, characterised in that the surface mounted device is attached to the surface of the wind turbine blade via three attachment parts, which are connected to parts of the surface mounted device and which attach the surface mounted device to three discrete areas on the surface of the blade, wherein the three discrete areas when seen in a top view are arranged in a triangle.

Equivalently, the second aspect provides a flow guiding device, which is adapted to be attached to the surface of a wind turbine blade, via three attachment parts, which are connected to parts of the surface mounted device and which are adapted to attach the surface mounted device to three discrete areas on the surface of the blade, wherein the three attachment parts when seen in a top view are arranged in a triangle.

This provides a particularly simple way of attaching add-ons to the surface of a wind turbine blade, since the three-point attachment will always be able to contact the surface of the blade despite having a complex curvature, as compared to for instance a device having four attachment parts, three attachment parts in line or a large bonding surface along the entire extent of the device, where it may be difficult to let all (or the entirety of the) attachment parts contact the blade. Thereby, the attachment provides a simple method of fitting the add-ons to the surface of the blade without the need of fixtures and lengthy preparation of the surface of blade. Accordingly, a worker may more quickly attach the surface mounted device to the surface of the blade.

According to a third aspect, the invention also provides a wind turbine blade for a rotor of a wind turbine having a substantially horizontal rotor shaft, said rotor comprising a hub, from which the wind turbine blade extends substantially in a radial direction when mounted to the hub, the wind turbine blade having a longitudinal direction with a tip end and a root end and a transverse direction, the wind turbine blade further comprising: a profiled contour including a pressure side and a suction side, as well as a leading edge and a trailing edge with a chord having a chord length extending there between, the profiled contour, when being impacted by an incident airflow, generating a lift, wherein a surface mounted device is attached to a surface of the wind turbine blade, wherein the surface mounted device in a lengthwise direction is curved, characterised in that a lengthwise radius of curvature of the surface mounted device varies from a proximal part of the surface mounted device to a distal part of the surface mounted device.

Equivalently, the third aspect of the invention provides a flow guiding device, which is adapted to be attached to the surface of a wind turbine blade, wherein the flow guiding device is curved in a lengthwise direction of the device, and wherein a lengthwise radius of curvature of the device varies from a proximal part of the device to a distal part of the device.

By varying the radius of curvature of the surface mounted device, it is possible to vary the stiffness of the device from the proximal part to the distal part of the device and/or to better control the transfer of loads from the blade and to the device itself.

The first, second and third aspect may be combined in any way. In the following a number of embodiments is described, which are applicable to all three aspects and in particular embodiments combining all three aspects.

According to an advantageous embodiment, the flexible housing is made of a first material and the surface mounted device made of a second material, wherein a hardness of the first material is smaller than the hardness of the second material. Alternatively, the first material is softer than the second material. In general, the housing should be more flexible than the surface mounted device.

The flexible housing may for instance be made of an elastomer material. Further, the housing is preferably relatively thin-walled.

According to an advantageous embodiment, the attachment part is tapered from a proximal part to a distal part of the attachment part, e.g. being bell-shaped, conical shaped, or frusto-conical shaped. Accordingly, the attachment part is shaped so that it has a larger surface area at a part proximal to the surface of the blade than a part distal to the part of the blade, whereby the attachment part prevents a notch effect at the surface of the blade and instead provides a gradual transition of loads transferred from the blade and onto the surface mounted device. Preferably, the attachment part is also tapered seen in a side view so that the height of the attachment part goes towards zero and provides a minimal notch effect.

The attachment part is advantageously formed so that a top view cross section of the attachment device is substantially circular. According to another advantageous embodiment, the attachment part is substantially oval.

Accordingly, the attachment device may be shaped similar to a flexible suction cup, which accommodates the surface of the blade. The cavity formed between the cup and the surface of the blade is filled with an adhesive, which is hardened or cured.

The housing of the attachment part may advantageously be made from rubber or polyurethane, or another suitable polymer material.

In another advantageous embodiment, the attachment part is connected to the surface mounted device via an adhesive bond or by being moulded onto the surface mounted device. Accordingly, the attachment part may be glued onto the surface mounted device. It is also possible to mould the attachment part onto the surface mounted device via for instance injection moulding.

The surface mounted device or the attachment part may also be provided with a grip or the like, which may facilitate easier handling for a worker attaching the surface mounted device to the surface of the blade by allowing the worker to more easily press the flexible housing against the surface of the blade. This is particular advantageous, if the device is mounted on site in the field.

The surface mounted device may in an advantageous embodiment be made from a polymer material, such as a polyurethane, optionally reinforced with reinforcement fibres, such as glass fibres or carbon fibres.

In a particular advantageous embodiment, the surface mounted device is made of a polyurethane (PUR) material, optionally reinforced with reinforcement fibres, and the attachment part is also made of a polyurethane (PUR) material. Accordingly, it is ensured that the attachment part and the device are compatible and provide a strong connection. The two parts may be integrally formed, or the parts may be for instance injection moulded in two steps. By using PUR material, it is further fairly simple to vary the hardness and stiffness of the parts, whereby the attachment part can be made relatively flexible and the surface mounted device may be made stiffer. A similar effect may be achieved by manufacturing the attachment device and/or surface mounted device in a thermoplastic material, which is particular relevant for high volume manufacturing. According to a preferred embodiment, the surface mounted device is not fibre reinforced. Thus, the device may be made of e.g. PUR or another polymer material only, which provides a device, which is simpler and cheaper to manufacture.

In an advantageous embodiment, the attachment part comprises a circumferential lip for attaching to the surface of the wind turbine blade. The circumferential lip thus forms the lower or proximal part of the attachment device and glue cavity formed between the housing and the surface of the wind turbine blade.

The circumferential lip may have a substantially flat attachment surface for mounting to the blade. Alternatively, the circumferential lip may have an inclined attachment surface so that the attachment surface accommodates to the surface of the wind turbine blade, when it is pressed against said surface of the wind turbine blade.

The circumferential lip may be provided with an adhesive, such as an adhesive tape, e.g. a pressure-sensitive double-adhesive tape, for providing a preliminary attachment to the blade surface. Thus, the adhesive provides a sealing to the blade surface, and provides the glue cavity, which is then filled with an adhesive and hardened or cured. The tape may be provided with a liner, which is removed after the flexible housing has preliminary been fitted to the surface of the blade. In another embodiment, a preliminary attachment is provided by screwing or riveting the attachment part on to the surface of the blade as a fixation during the adhesion filling process.

According to a preferred embodiment, the surface mounted device is a flow guiding device, such as a spoiler device or a Gurney flap. Thereby, it is seen that the device is a device, which changes the aerodynamics of a part of the wind turbine blade. However, the device may also be a trailing edge element, such as a plate comprising a serrated trailing edge.

According to another preferred embodiment, the surface mounted device comprises a plate-shaped element, which protrudes from the surface of the wind turbine blade. In the following, when referring to the surface mounted device, this may as such be a reference to the plate-shaped element of the surface mounted device.

The surface mounted device may be oriented so that it extends substantially in the longitudinal direction of the blade, i.e. the lengthwise direction of the surface mounted device is oriented substantially in the longitudinal direction of the blade. By "substantially in the longitudinal direction" is meant that the lengthwise direction of the surface mounted device forms an angle of 30 degrees or less to the longitudinal direction of the blade, advantageously 20 degrees or less, and even more advantageously 10 degrees or less.

According to another preferred embodiment, the surface mounted device is arranged on the pressure side of the blade. The surface mounted device, e.g. a flow-guiding device, may for instance be positioned at the trailing edge and forming a Gurney flap. However, according to a preferred embodiment, the surface mounted device is a spoiler device, which is arranged in a distance from the trailing edge of the blade, e.g. in a position between a position of maximum thickness of the blade profile and the trailing edge of the blade. Accordingly, the surface mounted device may be arranged so as to generate a separation of airflow from the pressure side of the blade at a point between the surface mounted device and the trailing edge of the blade, when the blade is impacted by the incident airflow. Accordingly, the surface mounted device or flow guiding device facilitates a pressure build-up between the device and the trailing edge and thus increased lift.

In one advantageous embodiment, the surface mounted device is curved in a lengthwise direction of the device. Such a design has the advantage that the surface mounted device may be stretched slightly in the lengthwise direction, e.g. when the blade bends or the blade shell ovalises. It is clear that it is the plate-shaped element that may be curved in the lengthwise direction.

In a particular advantageous embodiment, a lengthwise radius of curvature of the surface mounted device varies from a proximal part of the surface mounted device to a distal part of the surface mounted device. The radius of curvature may for instance increase from the proximal part to the distal part of the surface mounted device. This provides a simple embodiment, where the distal part of the device may be made stiffer than the proximal part. Accordingly, the proximal part may better accommodate to blade bending, whereas the distal part may better withstand the wind pressure and facilitate a build-up of pressure. The curvature of radius of the distal part may for instance approach infinity, in which case the distal part of the device is straight. In an alternative embodiment, the radius of curvature decreases from the proximal part to the distal part of the surface mounted device. The surface mounted device may for instance be formed as a part of a frusto-conical shape.

In one particularly advantageous embodiment, the surface mounted device is reinforced with a grid or rib structure. The grid or rib structure may for instance be provided as surface protrusions. The ribs may for instance be arranged along the two end parts of the plate-shaped element, and with a rib extending along a distal part of the plate-shaped element. Further or alternatively, the plate-shaped element may be provided with cross-ribs extending from near a distal part and end part and to a proximal and intermediate part of the plate-shaped element. This provides a strong triangular rib structure that adds strength to the plate shaped element. The rib or grid design may readily be moulded together with the plate-shaped element, in particular if the plate-shaped element is formed in PUR.

The plate-shaped element is advantageously not provided with a rib along the proximal part of the plate-shaped element, since this would prevent the plate-shaped element to accommodate blade bending or ovalisation. Thereby, the blade surface as such provides the third side (with variable length) of a triangle that provides stiffness to the plate-shaped element.

Overall, it is seen that the invention according to a fourth aspect provides a flow guiding device that comprises a plate-shaped element, which is reinforced with a rib structure, e.g. according to any of the previous embodiments. This provides the possibility of manufacturing the plate-shaped element in a polymer material without the need to fibre reinforce the structure.

The thickness of the spoiler is advantageously 0.5-10 mm, e.g. around 1-3 mm. The thickness of the rib or grid structure is advantageously 5-50 mm, e.g. around 15 mm.

The longitudinal length of the surface mounted device is advantageously 20-150 cm, or 25-120 cm. The height of the surface mounted device is advantageously 3-50 cm.

The hardness of the flexible housing is advantageously 20-75 on the Shore A scale, e.g. around 55 on the shore A scale. The hardness of the surface mounted device is advantageously 45-100 on the shore D scale, e.g. around 75 on the shore D scale. The lip of the attachment device advantageously has a maximum external dimension, such as an outer diameter, of 1-15 cm, or 2-10 cm. Thus, the proximal part of the attachment device may have this maximum external dimension.

In one embodiment, the surface mounted device is connected to the attachment part such that a spacing between a proximal part of the surface mounted device and the surface of the wind turbine blade is in the interval 1-20 mm, e.g. around 10 mm.

The plate-shaped element may be made with a flexibility that allows the plate-shaped element to deflect at high wind speeds and thereby reduce loads to the blade.

In another embodiment, the surface mounted device may be angled towards the leading edge of the blade so as to provide a pocket between the surface mounted device and the surface of the blade, said pocket facing towards the leading edge of the blade. This provides a spoiler device, which facilitates a build-up of pressure both in front of and behind the spoiler device, thereby increasing lift even further.

The surface mounted device (or plate-shaped element) is advantageously curved towards the leading edge of the blade, thus also providing the pocket between the surface mounted device and the surface of the blade. With a flexible plate-shaped element, this design also allows the surface mounted design to be collapsed or pressed against the surface of the blade, e.g. by use of straps, since the device will be flexible in a direction towards the leading edge of the blade and stiff in the direction of the incoming flow. This may be advantageous for transport purposes.

The surface mounted device may for instance be angled 5-45 degrees, or 10-40 degrees, e.g. around 25 degrees, compared to a surface normal at the attachment point. However, in principle, the surface mounted device may also be protruding substantially normal to a blade surface or be angled towards the trailing edge of the blade.

In an advantageous embodiment, the wind turbine blade is provided with a plurality of surface mounted devices. The plurality of surface mounted devices may for instance be arranged as longitudinally extending flow guiding device parts, which are grouped together to form a first flow guiding device group.

The plurality of surface mounted devices may advantageously be arranged in substantially mutual lengthwise extensions of each other. Accordingly, the flow guiding devices may be arranged juxtaposed with a small spacing between them or so that ends of juxtaposed devices substantially abut each other. The flow guiding devices may also be arranged slightly overlapping in the longitudinal direction.

The flow guiding devices may be arranged with a longitudinal spacing between the flow guiding parts. The longitudinal spacing may e.g. lie in an interval between 5 mm and 50 mm, or between 5 mm and 40 mm, or between 5 mm and 30 mm, e.g. around 10 mm. In one embodiment, the spacing between adjacent flow guiding parts is closed with a flexible body, e.g. made of a rubber material.

Thus, the first flow guiding device group may comprise separate or modular parts in particular in the longitudinal direction of the blade. The modular construction makes the construction more flexible and reduces peel forces at the ends of the flow guiding device parts. Thus, the modular parts have a smaller tendency to break off from the surface of the blade.

Longitudinally extending means that the flow guiding device parts are extending substantially in the longitudinal direction of the blade. Thus, the device parts typically have a first side (nearest the leading edge) and a second side (nearest the trailing edge) as well as a first longitudinal end (nearest the root end) and a second longitudinal end (nearest the tip end).

Advantageously, the first side faces substantially towards the leading edge of the blade.

The flow guiding device is preferably permanently attached to the surface of the wind turbine blade and cannot be actively controlled. Thus, the orientation of the front surface is non-adjustable. Also, it is recognised that the flow guiding device is utilised for increasing the lift and the energy yield. Thus, the flow guiding device may alternatively be denoted as a high lift device.

By incident flow is meant the inflow conditions at a blade section during normal use of the blade, i.e. rotation on a wind turbine rotor. Thus, the incoming flow is the inflow formed by the resultant of the axial wind speed and the rotational component as it is seen by the local section of the blade. By oncoming flow is meant the flow impinging the flow guiding device, i.e. the local flow on the pressure side of the blade meeting and impacting the flow guiding device.

According to one embodiment, the flow guiding device parts are spoiler device parts. Again, it must be pointed out that the parts are preferably non-adjustable and arranged to increase the lift of the wind turbine blade and thus the energy yield of the wind turbine. Accordingly, the spoiler parts are not used for breaking purposes.

According to an advantageous embodiment, the flow guiding device parts comprise planar or plate-shaped elements protruding from the profile. Thereby, a particularly simple design of the flow guiding device parts is provided. Furthermore, this design is much more flexible than the typically wedge-shaped design, which is very rigid. Thus, the planar design has a smaller tendency to have high joint loads, which in worst case can make the flow guiding device parts break off from the surface of the wind turbine blade.

According to an advantageous embodiment, the flow guiding device parts together form a substantially continuous first side facing towards the leading edge of the blade so that the flow guiding device parts together form a flow guiding device, which is arranged and adapted to form a separated airflow between the glow guiding device and the trailing edge of the blade.

According to one advantageous embodiment, the flow guiding device parts are shaped so that they have an inflow surface with a start point oriented towards the leading edge of the blade and an end point oriented towards the trailing edge of the blade, the distance between the inflow surface and the profiled contour increasing from the start point to the end point. Thus, the flow guiding device parts may have a substantially wedge shaped or triangularly shaped profile. However, the inflow surface may also be provided by a planar element oriented backwardly or towards the trailing edge of the blade. The angle of the inflow surface and surface height of a distal point of the inflow surface may advantageously correspond to those described in European patent applications WO2010066500 and WO2010066501, respectively, by the present applicant.

According to an advantageous embodiment, the flow guiding device of the blade has a front surface facing towards the oncoming airflow and having a proximal point located at the profiled contour and a distal point located at a distance (i.e. with a spacing) from the profiled contour of the blade, wherein the profiled contour has a surface normal at the proximal point, and wherein the front surface of the flow guiding device comprises at least a first portion, which is angled towards an oncoming airflow so that an average tangent or median line to said first portion forms a first angle with the surface normal being larger than 0 degrees.

Accordingly, the front surface of the flow guiding device, seen from the proximal point, is angled towards the oncoming airflow and thus also towards the leading edge of the blade. Thus, when the profiled contour of the blade is impacted by the incident airflow, the flow guiding device creates an air pocket in front of the front surface, which increases the local pressure in front of the flow guiding device, and which guides the airflow around the flow guiding device. Further, the flow guiding device functions as an obstruction to the flow on the pressure side of the profile. Downstream of the flow guiding device, i.e. typically between the flow guiding device and the trailing edge of the blade, a separation of the airflow occurs. This obstruction is resulting in a higher pressure after the flow guiding device, i.e. between the flow guiding device and the trailing edge of the wind turbine blade, due to a detachment of the flow. Thus, the pressure is increased both in front and behind of the flow guiding device, which in turn increases the lift significantly on this section of the blade at the governing inflow angles for this section. A realistic estimate of the potential performance improvement is 1-2% of annual energy yield compared to conventional wind turbine blades without such flow guiding devices.

The terms average tangent or median line here mean that the first portion of the front surface on average is angled towards the oncoming flow. This corresponds to a linear fit to the first portion of the front surface of the flow guiding device being angled towards the oncoming flow and the leading edge of the blade.

The forwardly angled first portion also results in a tangent to the profile and the tangent or median line to the first portion of the front surface forming an angle being less than 90 degrees.

From the definitions, it is clear that the front surface may comprise a second portion, which is not angled towards the oncoming flow and the leading edge of the blade.

According to an advantageous embodiment, the first angle is at least 5 degrees, or at least 10 degrees, or at least 15 degrees. The first angle may even be at least 20 degrees or at least 25 degrees or at least 30 degrees. Higher angles more efficiently provide the air pocket and may also decrease the drag, since the front surface does not have to protrude as much from the surface in order to provide the build-up of pressure in front of the flow guiding device. On the other hand even higher angles make the effective height of the flow guiding device smaller.

According to another advantageous embodiment, the front surface is concave. The front surface of the flow guiding device may guide the airflow across the concave surface and thus contribute further to forming a re-circulating zone in front of the flow guiding device.

According to yet another advantageous embodiment, the plurality of longitudinally extending flow guiding device parts comprises individual flow guiding device parts, which are at least partially overlapping in the longitudinal direction of the blade. Thus, the individual flow guiding device parts are individually displaced in the transverse direction of the blade. Accordingly, a first end of a first flow guiding device extends beyond the radial position of a second end of a second flow guiding device part.

In one embodiment, the individual flow guiding device parts are substantially straight in the longitudinal direction. In another embodiment, the individual flow guiding device parts are curved in the longitudinal direction. For example, every second flow guiding device part may be convex and the others concave. This can also be combined with the partially overlapping design.

According to yet another advantageous embodiment, the first flow guiding device group has a corrugated design in the longitudinal direction, advantageously at least a distal point of a plate-shaped element. The design may for instance be wavy in the longitudinal direction and comprise alternating flow guiding device parts being concave and convex, respectively. Alternatively, a trapezium shaped design may be used. These designs have the advantage that the flow guiding device parts may be stretched slightly in the longitudinal direction, when the blade bends. The individual flow guiding device parts may also be corrugated.

Preferably, the flow guiding device group is formed as a longitudinally extending device. According to an advantageous embodiment, the flow guiding device group extends along at least 5% of a longitudinal extent of the wind turbine blade. Yet again, the longitudinal extent of the flow guiding device group may be at least 7%, 10%, 15%, or even 20% of the longitudinal extent or length of the blade.

According to another embodiment, the longitudinally extending flow guiding device group extends along at least 1 meter of the blade, or at least 2 meters, or at least 3 meters, or at least 4 meters, or at least 5 meters, or at least 6 meters, or even at least 8 or 10 meters of the wind turbine blade.

The wind turbine blade or at least an aerodynamic shell of the wind turbine may advantageously be made of a composite structure, such as a polymer matrix reinforced with a fibre reinforcement material, such as glass fibres or carbon fibres. The resin may be a thermosetting resin, such as epoxy, vinylester, polyester. The resin may also be a thermoplastic, such as nylon, PVC, ABS, polypropylene or polyethylene. Yet again the resin may be a thermosetting thermoplastic, such as cyclic PBT or PET. The flow guiding device may also be made of such composite materials. The polymer matrix material may also be a polyurethane resin.

The wind turbine blade may be made with a load bearing spar beam and an aerodynamic shell attached to said beam. Alternatively, the load bearing structure may be integrated into the blade shell with spar caps (also called main laminates) integrated in the blade shell and intermediate shear webs attached between the spar caps.

In one embodiment, the profiled contour is divided into a root region having a substantially circular or elliptical profile closest to the hub, an airfoil region having a lift-generating profile furthest away from the hub, and a transition region between the root region and the airfoil region, the transition region having a profile gradually changing in the radial direction from the circular or elliptical profile of the root region to the lift-generating profile of the airfoil region. The surface mounted device may advantageously be provided in the transition region of the blade.

According to a particular advantageous embodiment, the flow guiding device is arranged in the transition region of the profiled contour, preferably on the pressure side of the blade. The device can increase the lift in the transition region and thus contribute to the energy yield. Advantageously, the flow guiding device extends substantially along an entire longitudinal extent of the transition region, thus contributing to the increased lift along the entire transition region.

Yet again, the flow guiding device may advantageously extend into the airfoil region. This will add lift to the airfoil region and thus increase the annual energy yield. In principle it may also extend into the root region. Also, the flow guiding device may be arranged in the root region alone, or in the airfoil region alone.

In a preferred embodiment, the surface mounted device is attached to the surface of the blade via three attachment parts, wherein a first attachment part is connected near a first end of the surface mounted device, a second attachment part is connected near a second end of the surface mounted device, and a third attachment part is connected at an intermediate part of the surface mounted device. The three attachment parts may, when seen in a top view, be arranged in a triangle on the surface of the wind turbine blade. The triangle may have an acute angle being at least 5 degrees, or at least 10 degrees.

In one advantageous embodiment, the attachment part or the flexible housing is made of a double-adhesive tape. This provides a particular simple method of forming the shape of the attachment part and the cavity which is to be filled with the adhesive, which forms the adhesive bonding.

Accordingly, the double-adhesive tape may in one embodiment form a circumferential part between the surface of the wind turbine blade and the surface mounted device, and further form a cavity between the double-adhesive tape, the surface of the wind turbine blade and a part of the surface mounted device.

In one advantageous embodiment, the double-adhesive tape comprises a layer of compressible material. This provides a viscoelastic housing. The compressible material may for instance be a layer of foam cells, such as acrylic foam. The double-adhesive tape may have a thickness of at least 0.5 mm, and preferably at least 1 mm. Further, the adhesive tape may have a thickness of maximum 10 mm, or maximum 7 mm, or maximum 5 mm. Accordingly, a cavity having a height of 0.5 mm to 10 mm may be formed, e.g. having a height of 1 mm to 5 mm.

According to another aspect, the invention provides a wind turbine comprising a number of blades, preferably two or three, according to any of the aforementioned embodiments.

The first aspect of the invention also provides a method of attaching a surface mounted device to a surface of a wind turbine blade, wherein the wind turbine blade has a longitudinal direction with a tip end and a root end and a transverse direction, wherein the wind turbine blade further comprises a profiled contour including a pressure side and a suction side, as well as a leading edge and a trailing edge with a chord having a chord length extending there between, the profiled contour, when being impacted by an incident airflow, generating a lift, wherein the method comprises the steps of:
a) providing the wind turbine blade,
b) proving a surface mounted device for mounting on the surface of the blade, the surface mounted device having at least one attachment part connected to a part of the surface mounted device, wherein the attachment part comprises a flexible housing adapted to form a cavity between at least the housing and the surface of the wind turbine blade,
c) positioning the attachment part on a first discrete area of the surface of the blade so that a cavity is formed between at least the housing and the surface of the wind turbine blade,
d) injecting an adhesive or resin into the cavity, and
e) curing or hardening the adhesive or resin so that the device is attached to the surface of the wind turbine blade via an adhesive bonding.

The method involving an attachment part with a glue cavity also provides a particular simple method of attaching the surface mounted device to the surface of the blade. Since the housing of the attachment part is flexible, the attachment part accommodates to the curvature of the blade surface, e.g. by applying pressure to the attachment part. The exact position of the device may also be fine-tuned by carefully moving the attachment parts so that the desired position is obtained. Overall, the new attachment method provides a simple method of fitting the add-ons to the surface of the blade without the need of fixtures and lengthy preparation of the surface of blade. Further, the flexible housing also acts as a glue shaper and glue stopper, which alleviates the subsequent need for finishing operations, such as removal of excessive adhesive. Accordingly, a worker may more quickly attach the surface mounted device to the surface of the blade than with prior art techniques.

The cavity may be formed by pressing the attachment part against the surface of the blade.

The attachment part is preferably previously connected to the device, e.g. by gluing or moulding the attachment part onto the device. The connection part is preferably connected to a proximal part of the surface mounted device. The proximal part of the surface mounted device is the part, which is located nearest the blade surface and so to speak is attached to the surface of the blade. However, by utilising the attachment parts, it is clear that there may be a spacing between the proximal part of the surface mounted device and the surface of the blade. However, in principle, the micro-attachment device may in an alternative embodiment be connected to the device as part of the glue filling and hardening steps of steps d) and e).

It is clear that the surface mounted device is preferably attached to an external surface of the wind turbine blade. However, it may also be an internal surface of the wind turbine blade.

In one embodiment, the first discrete area of the wind turbine blade is degreased prior to step a, e.g. via an alcohol based rub. Thereby, it is ensured that an effective adhesive bond can be provided to the surface of the blade. The degreasing is advantageously carried out on a gelcoat of the wind turbine blade. However, compared to previous attachment methods, it is not necessary to grind the gelcoat in order to reveal fibre material for bonding.

In a preferred embodiment, the attachment part comprises a circumferential lip for attaching to the surface of the wind turbine blade. The circumferential lip thus forms the lower or proximal part of the attachment device and seals to the surface of the blade, thereby forming the glue cavity between the housing and the surface of the wind turbine blade. The circumferential lip may have a substantially flat attachment surface for mounting to the blade. The circumferential lip may alternatively have an inclined attachment surface so that the attachment surface accommodates to the surface of the wind turbine blade, when it is pressed against said surface of the wind turbine blade.

The circumferential lip may be provided with an adhesive, such as an adhesive tape, e.g. a pressure-sensitive double-adhesive tape, for providing a preliminary attachment to the blade surface. This is particular useful of in situ retrofitting of add-ons to the surface of the blade.

Thus, the tape provides a sealing to the blade surface, and provides the glue cavity, which is then filled with an adhesive and hardened or cured. The preliminary attachment may ensure that the attachment part does not move during the injection step, and further prevents that adhesive escapes from the sides of the attachment device during the injection step. This is particular advantageous, since the injection of adhesive may be carried out without previous evacuation of the cavity, and in that the injection of adhesive may build up pressure in the cavity.

The tape may be provided with a liner. The liner is advantageously provided with a tap so that the liner can be pulled out from the lip. Thus, the lip of the attachment part may be pressed against the surface of the blade. Once the device and attachment part are located in the correct position, the liner is removed, whereby the lip is preliminary attached to the surface of the wind turbine blade, and after which injection of adhesive into the cavity may be carried out.

In an alternative embodiment, a few drops of adhesive are applied to the lip of the flexible housing. The fastening element can still be moved along the blade surface and once the desired position is found, the lip is simply pressed against the blade surface until the adhesive at least partially hardens and provides a preliminary attachment to the blade surface.

In another embodiment, the attachment part is prior to step d) mechanically fixed to the surface of the wind turbine blade, e.g. via a screw connected through the attachment part and to an alignment hole formed in the surface of the wind turbine blade. The mechanical fixation means, e.g. the screw, may be removed after the injection and curing of adhesive. The hole from the screw may then be filled with a sealant.

In another embodiment, a micro-environment treatment is carried out in the cavity prior to step d). The micro-environment treatment may for instance be chosen from the group of evacuating the cavity, heating the cavity, or a degasification, e.g. via filling the cavity with nitrogen. Thereby, the cavity may be dried before the injection step, which may improve the adhesive bond even further, since moist is removed prior to the injection.

It is also possible to position the attachment part on the blade of the surface by use of a fixture to keep the attachment part in place, while the adhesive is injected into the cavity. This embodiment is particular useful, if the add-ons are mounted to the surface of the blade at the factory.

In one advantageous embodiment, the flexible housing is provided with a bore from the cavity to an exterior. Thereby, gas or air is able to escape from the cavity during the injection step. The bore is preferably relatively small. The bore may advantageously be provided near a distal part of the flexible housing, whereby the adhesive or resin filled into the cavity pushes the air towards a top part of the cavity. It is also possible to apply suction to the bore. The bore may also provide a visual confirmation of the filling process, e.g. when liquid adhesive starts pouring out from the hole, the injection of the adhesive may be stopped.

The flexible housing may also be made of an at least partially transparent material, such that the filling process can easily be monitored.

The cavity may be connected to an adhesive reservoir or chamber during the curing or hardening in step e). Thus, if the adhesive shrinks during the hardening, additional liquid adhesive will be drawn into the cavity and fill the voids. The adhesive of the reservoir should of course harden at a later stage than the adhesive in the cavity such that liquid adhesive is not drawn in the wrong direction.

In a first additional aspect of the invention, the attachment part or the flexible housing of the attachment part is made from double-adhesive tape, wherein the double-adhesive tape is arranged to form a circumferential part and so as to form a cavity formed by partly by the double-adhesive tape, the surface of the blade, and a part of the surface mounted device.

In other words, the first additional aspect provides a wind turbine blade for a rotor of a wind turbine having a substantially horizontal rotor shaft, said rotor comprising a hub, from which the wind turbine blade extends substantially in a radial direction when mounted to the hub, the wind turbine blade having a longitudinal direction with a tip end and a root end and a transverse direction, the wind turbine blade further comprising:

a profiled contour including a pressure side and a suction side, as well as a leading edge and a trailing edge with a chord having a chord length extending there between, the profiled contour, when being impacted by an incident airflow, generating a lift, wherein a surface mounted device is attached to a surface of the wind turbine blade, wherein the surface mounted device is attached to the surface of the wind turbine blade via at least a first attachment part, which is connected to a part of the surface mounted device, wherein the attachment part comprises a flexible housing made of an double-adhesive tape that forms a cavity between at least the housing, the surface of the wind turbine blade, and a part of the surface mounted device, and wherein the cavity is filled with an adhesive that provides an adhesive bonding to the surface of the wind turbine blade.

Similar to the previous embodiments, the double-adhesive tape may form a circumferential part, such as a lip, of the flexible housing.

The circumferential part may have a small opening, such that it may provide a visual confirmation of the filling process, e.g. when liquid adhesive starts pouring out from the hole, the injection of the adhesive may be stopped.

In one advantageous embodiment, the double-adhesive tape comprises a layer of compressible material. This provides viscoelastic housing. The compressible material may for instance be a layer of foam cells, such as acrylic foam. The double-adhesive tape may have a thickness of at least 0.5 mm, and preferably at least 1 mm. Further, the adhesive tape may have a thickness of maximum 10 mm, or maximum 7 mm, or maximum 5 mm. Accordingly, a cavity having a height of 0.5 mm to 10 mm may be formed, e.g. having a height of 1 mm to 5 mm.

In a second additional aspect, the invention provides a method of attaching a surface mounted device to a surface of a wind turbine blade, wherein the wind turbine blade has a longitudinal direction with a tip end and a root end and a transverse direction, wherein the wind turbine blade further comprises a profiled contour including a pressure side and a suction side, as well as a leading edge and a trailing edge with a chord having a chord length extending there between, the profiled contour, when being impacted by an incident airflow, generating a lift, wherein the method comprises the steps of:

a) providing the wind turbine blade,
b) arranging double-adhesive tape on the surface of the wind turbine blade so as to form a circumferential part of an attachment part
c) arranging a device for mounting on the surface of the blade on the double-adhesive tape so that a cavity of an attachment part is formed between at least the double-adhesive tape, the surface of the wind turbine blade, and a part of the device,
d) injecting an adhesive or resin into the cavity, and
e) curing or hardening the adhesive or resin so that the device is attached to the surface of the wind turbine blade via an adhesive bonding.

It is recognised that the double-adhesive tape may be arranged directly on the surface of the wind turbine blade and that the device is then later arranged on top of the double-adhesive tape in order to form the cavity, or alternatively that the double-adhesive tape may be arranged on the device and that the device with the double-adhesive tape is then arranged on the surface of the wind turbine blade in order to form the cavity.

BRIEF DESCRIPTION OF THE FIGURES

The invention is explained in detail below with reference to embodiments shown in the drawings, in which.

DETAILED DESCRIPTION OF THE INVENTION

Figure 1:
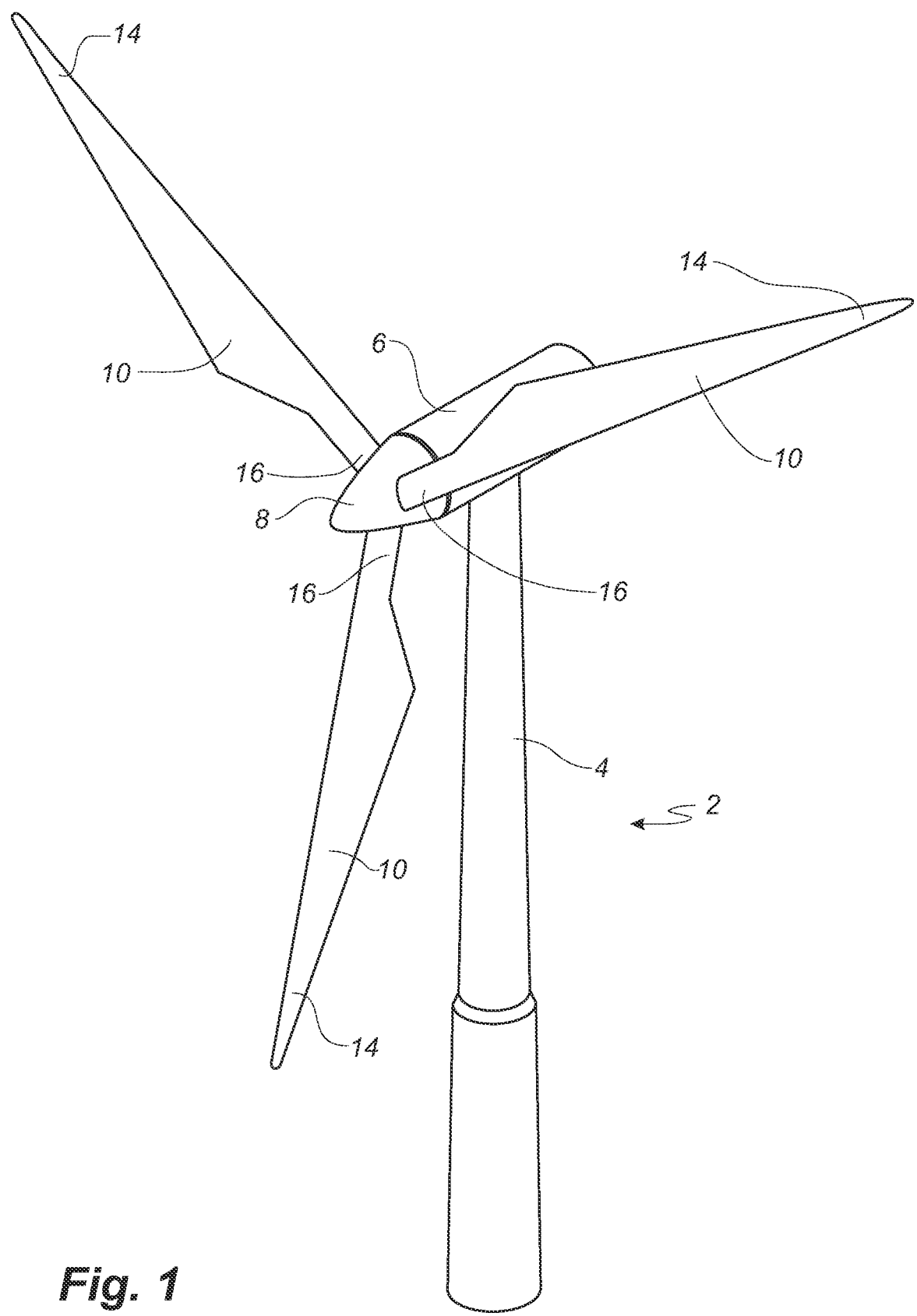
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8.

Figure 3:
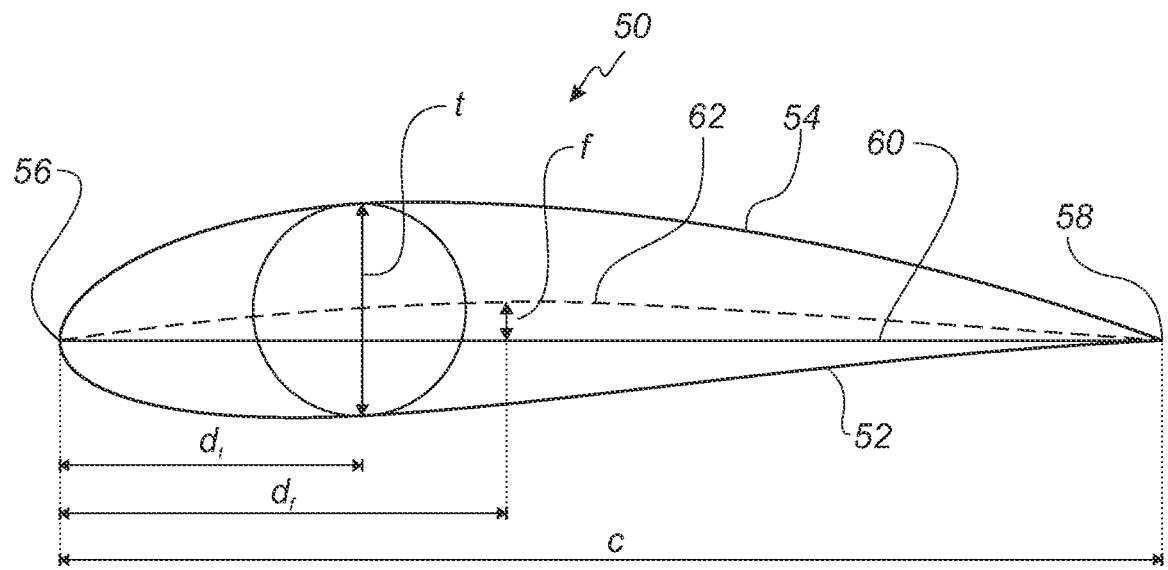
FIG. 3 shows a schematic view of an airfoil profile.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward side and the leeward side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Figure 2:
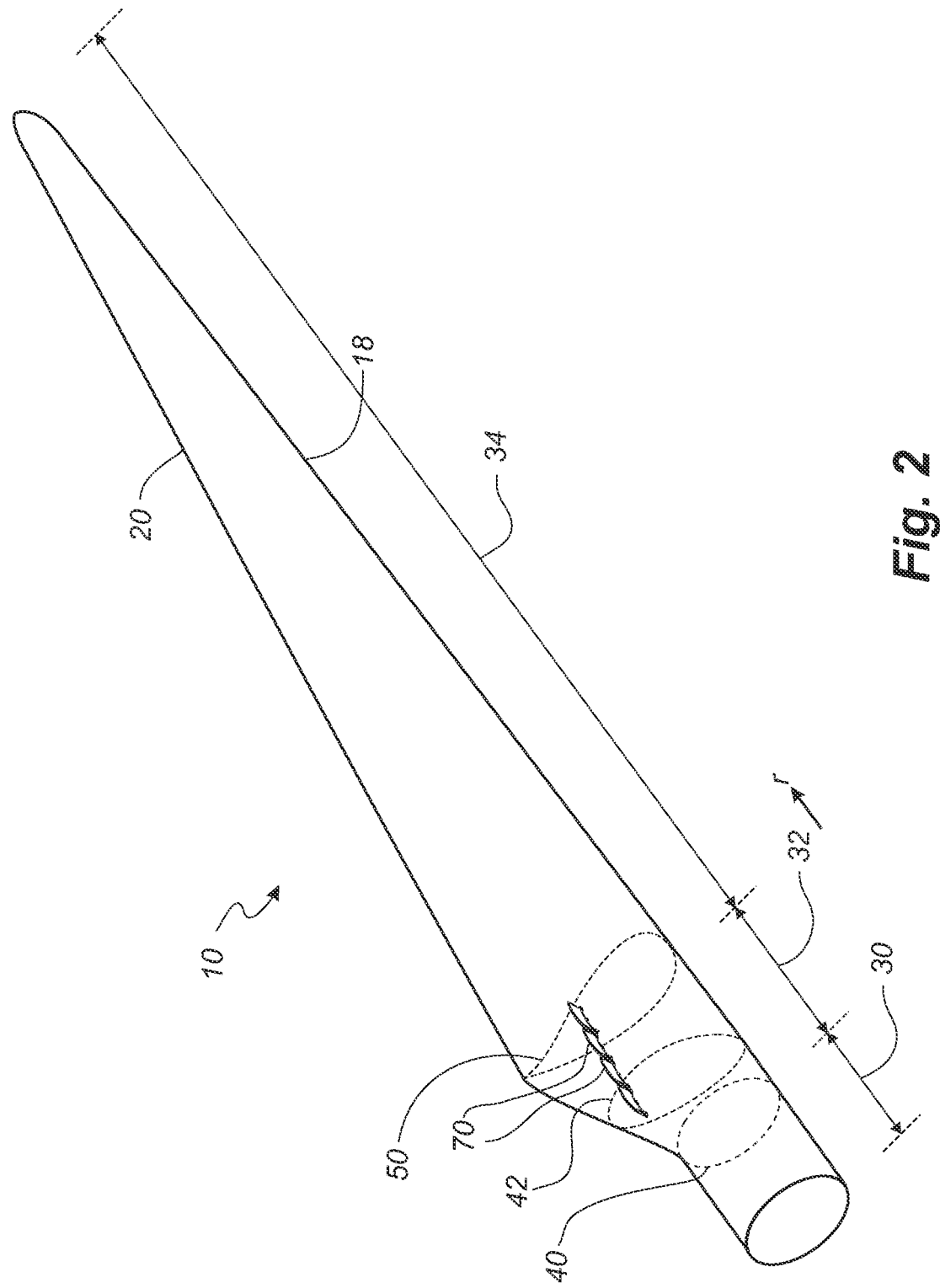
FIG. 2 shows a schematic view of a first embodiment of a wind turbine blade provided with flow guiding device parts according to the invention, seen in perspective.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The width of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

The chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 4:
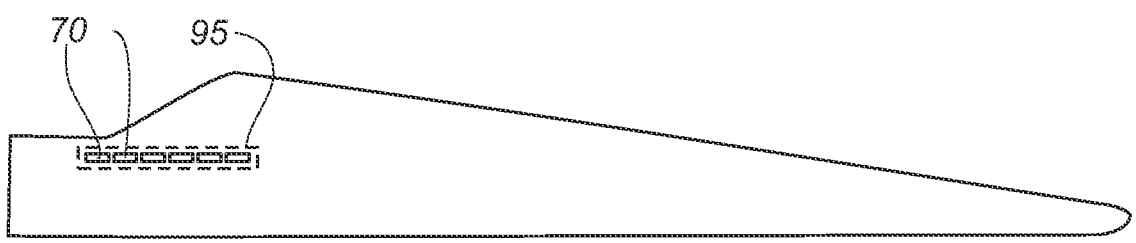
FIG. 4 shows a top view of a wind turbine blade according to the invention.

The wind turbine blade 10 according to the invention is provided with a number of surface mounted devices in form of flow guiding device parts 70, which are grouped together and protrude from the pressure side of the blade in at least the transition region 32 of the blade so as to form a flow guiding device group 95 as shown in top view in FIG. 4. However, advantageously the flow guiding device parts 70 may also extend into the airfoil region 34 and/or the root region 30 of the blade.

Figure 5E:
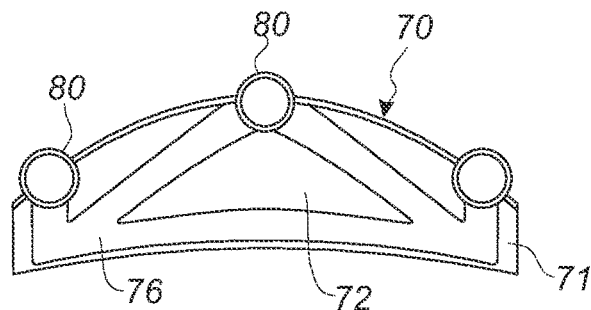
FIG. 5a shows a bottom view of a flow guiding device and associated attachment parts according to the invention.
FIG. 5b shows a side view of the flow guiding device and associated attachment parts of FIG. 5a, FIG. 5c shows a rear view of the flow guiding device and associated attachment parts of FIG. 5a, FIG. 5d shows a rear perspective view of the flow guiding device and associated attachment parts of FIG. 5a, FIG. 5e shows a front perspective view of the flow guiding device and associated attachment parts of FIG. 5a, FIG. 6a shows a proximal part of the flow guiding device with an associated attachment part according to the invention.
Figure 5E:
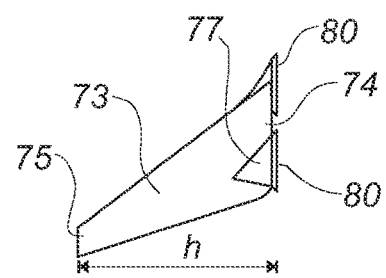
Figure 5E:
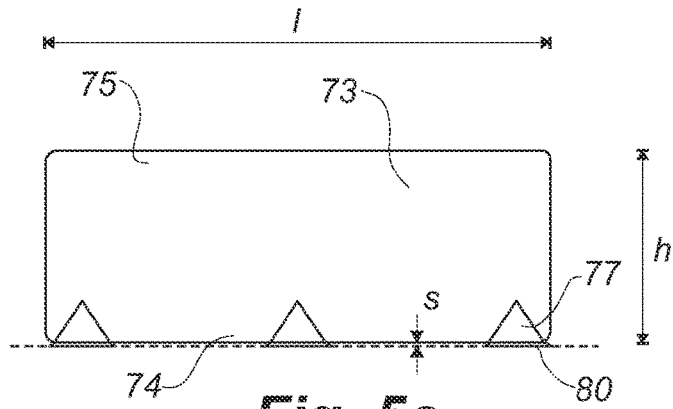
Figure 5E:
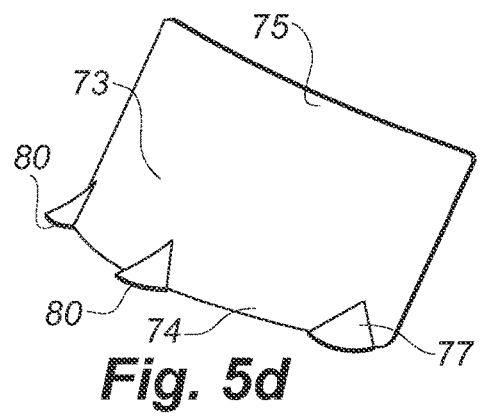
Figure 5E:
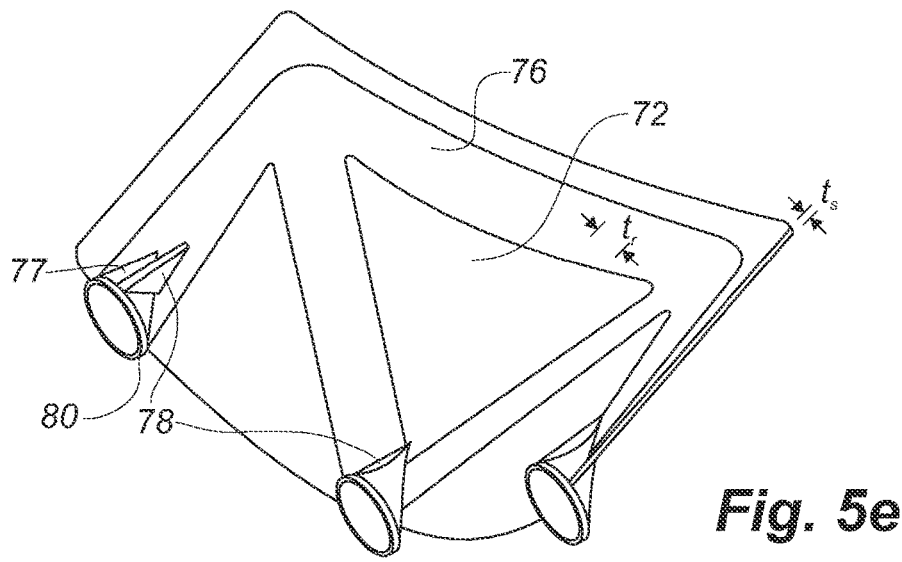

FIGS. 5a-e show a flow guiding device part 70 according to the invention, which is adapted to function as a spoiler and attached to the surface of a wind turbine blade, e.g. as shown in FIGS. 2 and 4. FIG. 5a shows a bottom view, FIG. 5b shows a side view, FIG. 5c shows a rear view, FIG. 5d shows a perspective view showing the rear, and FIG. 5e shows another perspective view showing the front of the flow guiding device part 70.

It is seen that the flow guiding device part 70 comprises a plate-shaped element 71 that protrudes from the surface of the blade, when the flow guiding device part 70 is mounted to the surface of the blade, and which provides an obstruction to the incoming flow. The plate-shaped element 71 comprises a front surface 72, which faces towards the leading edge 18 of the blade 10 and thus towards the incoming flow, and a rear surface 73, which faces towards the trailing edge 20 of the blade 10 and thus away from the incoming flow.

The plate-shaped element 71 comprises a proximal part 74 or lower part, which—when the flow guiding device part 70 is mounted to the surface of the blade—is located nearest the blade surface, and a distal part 75 or upper part, which is located farthest from the blade surface. The plate-shaped element 71 is curved in the lengthwise or longitudinal direction and has a first curvature of radius at the proximal part 74 of the plate-shaped element 71 and a second curvature of radius at the distal part 75 of the plate-shaped element.

In the shown embodiment, the plate-shaped element 70 forms part of the outer surface of a frusto-conical element and thus the second radius of curvature is smaller than the first curvature of radius. However, in an alternative embodiment, the second curvature of radius is larger than the first curvature of radius, which may provide a stiffer structure to the distal part 75 of the plate-shaped element 71. The second radius of curvature may for instance approach infinity, in which case the distal part 75 of the plate-shaped element 71 is straight. In yet another embodiment, the radius of curvature may be constant from the proximal part 74 to the distal part 75 of the plate-shaped element.

The plate-shaped element 71 is further angled forwards towards the leading edge of the blade so as to provide a pocket between the plate-shaped element 71 and the surface of the blade, said pocket facing towards the leading edge of the blade. Since the plate-shaped element 71 is curved towards the leading edge of the blade (i.e. being concave as seen from the leading edge of the blade), this also attributes to forming the pocket between the surface mounted device and the surface of the blade. With a flexible plate-shaped element 71, this design also allows the surface mounted design to be collapsed or pressed against the surface of the blade, which may be advantageous for transport purposes.

The flow guiding device part 70 comprises three attachment parts 77, which are utilised to attach the flow guiding device part 70 to the surface of the blade. Each of the attachment parts 77 are tapered from a proximal part to a distal part of the attachment part 77 such that the proximal part has a greater surface area than the distal part. The attachment part may for instance be substantially bell-shaped, conical or frusto-conical shaped. This minimises notch effects at the surface of the blades and provides a gradual transition of loads transferred from the blade 10 and onto the flow guiding device part 70, when the blade bends or the blade shell ovalises. As seen in FIG. 5c, the attachment part 77 is preferably also tapered in the side-view so that the height of the attachment part 77 approaches zero at a circumference, thus minimising the notch effect.

The attachment part 77 further includes a flexible housing 80, which forms a cavity between at least the flexible housing 80 and the surface of the wind turbine blade. A part of the attachment part 77 may be moulded as a first piece together with the plate-shaped element 71, and the flexible housing 80 may be moulded onto this first piece. Alternatively, the flexible housing may be glued onto and/or mechanically connected to the first piece.

The flow guiding device part 70 may be attached to three discrete areas on the surface of the blade, wherein the three discrete areas when seen in a top view are arranged in a triangle as for instance seen in FIG. 5a. This provides a particularly simple way of attaching add-ons to the surface of a wind turbine blade, since the three-point attachment will always be able to contact the surface of the blade despite having a complex curvature. The triangle may have an acute angle being at least 5 degrees, or at least 10 degrees.

The plate-shaped element 71 may, as seen in FIGS. 5a and 5e, further be reinforced with a grid or rib structure 76. The ribs may for instance be arranged along the two end parts of the plate-shaped element 71, and with a rib extending along a distal part of the plate-shaped element. Further or alternatively, the plate-shaped element may be provided with cross-ribs extending from near a distal part and end part and to a proximal and intermediate part of the plate-shaped element 71. This provides a strong triangular rib structure that adds strength to plate-shaped element 71. The rib or grid design may readily be moulded together with the plate-shaped element 71. The grid or rib structure may for instance be provided as surface protrusions.

The flow guiding device part 70 may further be provided with a grip or the like, e.g. provided on the attachment part 77 as shown in FIG. 5e. This grip 78 may facilitate easier handling for a worker attaching the flow guiding device part 70, which can use the grip to better press the flexible housing against the surface of the blade. This is particularly advantageous, if the flow guiding device parts 70 are mounted on site.

The thickness $t_s$ of the plate-shaped element 71 is advantageously 0.5-10 mm, e.g. around 1.5-3 mm. The thickness $t_r$ of the rib or grid structure 76 is advantageously 5-50 mm. The longitudinal length l of the surface mounted device is advantageously 20-150 cm, or 25-120 cm. The height h of the surface mounted device is advantageously 3-50 cm. The plate-shaped element 71 is preferably connected to the attachment part 77 such that a spacing s between the proximal part 74 of the plate-shaped element 71 and the surface of the wind turbine blade is in the interval 1-20 mm, e.g. around 10 mm.

The flow guiding device 70 and the attachment part 77 may be made of polyurethane (PUR) material or a thermoplastic polymer, optionally reinforced with reinforcement fibres, and the attachment part is also made of a polyurethane (PUR) or thermoplastic material. The hardness of the flexible housing 80 is advantageously 20-75 on the Shore A scale, e.g. around 55 on the shore A scale. The hardness of the plate-shaped element 71 is advantageously 45-100 on the shore D scale, e.g. around 75 on the shore D scale.

Figures 6A, 6B:
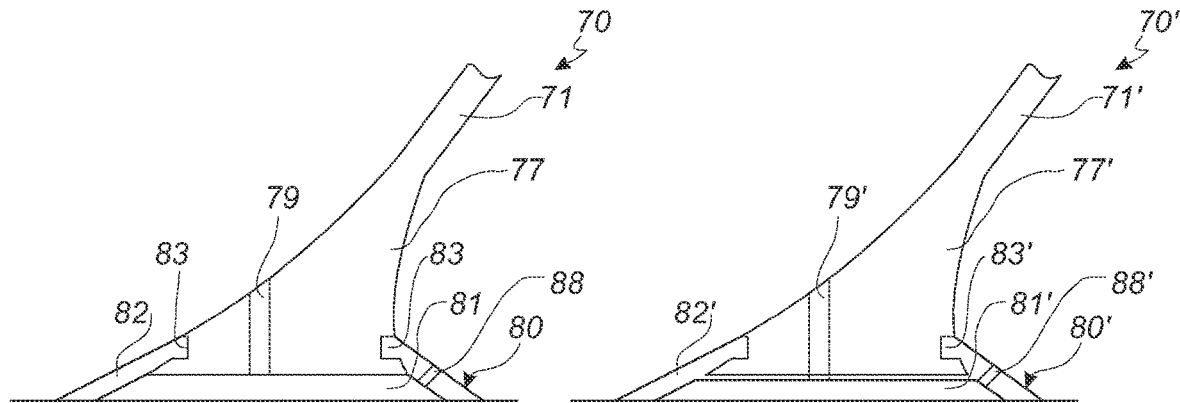
FIG. 6b shows an alternative embodiment of the proximal part of the flow guiding device and the associated attachment part of FIG. 6a, FIG. 7a is a cross-sectional view of attachment parts according to the invention.

FIGS. 6a and 6b show detailed cross-sectional views of a first embodiment and a second embodiment of a flow guiding device part according to the invention and provided with attachment parts according to the invention.

FIG. 6a shows a first embodiment of the flow guiding device part 70 and the attachment part 77. It is seen that a tapered section of the attachment part 77 and the plate-shaped element are integrally formed, e.g. as a moulded element. The flexible housing 80 is connected to a recess 83 of the tapered section of the attachment part 77. The flexible housing may be glued onto or moulded onto the tapered section. The flexible housing 80 comprises a circumferential lip 82, which is sealed against the surface of the wind turbine blade. This provides a glue cavity 81, which is formed between the surface of the blade, the flexible housing 80 and a lower part of the tapered section of the flow guiding device part 70. A bore or hole 79 is provided through the attachment part 77 and which can communicate with the glue cavity 81 such that an adhesive may be filled into the cavity 81 via the bore 79. The flexible housing further comprises a ventilation hole 88, whereby gas or air is able to escape from the cavity 81 during a step of injecting an adhesive into the cavity. The ventilation hole 88 may also provide a visual confirmation of the filling process, e.g. when liquid adhesive starts pouring out from the hole, the injection of the adhesive may be stopped.

FIG. 6b shows a second embodiment of a flow guiding device part 70' and an attachment part 77', where like numerals refer to like parts of the first embodiment. Therefore, only the difference between the two embodiments is described. The second embodiment differs from the first embodiment in that the flexible housing encases a lower part of the tapered section 77' or the plate-shaped element 70', such that the glue cavity 81' is formed between the flexible housing 80 and the surface of the blade only.

The lip 82 of the attachment device 77 advantageously has a maximum external dimension, such as an outer diameter, of 1-15 cm, or 2-10 cm. Thus, the proximal part of the attachment device 77 may have this maximum external dimension.

Figures 7A, 7B:
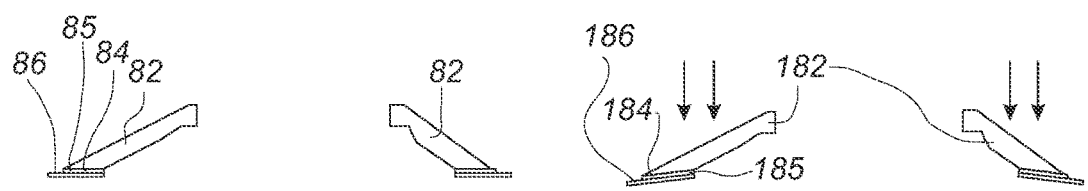
FIG. 7b is a cross-sectional view of an alternative embodiment of the attachment parts of FIG. 7a, FIG. 8 illustrates an adhesive injection step of a method according to the invention.

According to one embodiment shown in FIG. 7a, the circumferential lip 82 may comprise a substantially flat attachment surface 84 for mounting to the blade. The attachment surface may be provided with a pressure-sensitive double adhesive tape 85 for providing a preliminary attachment to the blade surface. The tape 85 may be provided with a liner 86, which is removed prior to fitting the flexible housing 80 to the surface of the blade. The liner 86 is advantageously provided with a tap so that the liner 86 can be pulled out from the lip 82. Thus, the lip 82 of the flexible housing 80 may be pressed against the surface of the blade. Once the device 70 and attachment part 77 is located in the correct position, the liner 86 is removed, whereby the lip 82 is preliminary sealed to the surface of the wind turbine blade and provides the glue cavity 81, and after which injection of adhesive into the cavity 81 may be carried out.

According to another embodiment shown in FIG. 7b, a circumferential lip 182 of the flexible housing has an inclined attachment surface 184. Similar to the embodiment shown in FIG. 7a, the attachment surface may be provided with a pressure-sensitive double adhesive tape 185 for providing a preliminary attachment to the blade surface, which in turn is provided with a liner 186. The incline of the attachment surface 184 accommodates to the surface of the wind turbine blade, when it is pressed against said surface of the wind turbine blade, which is illustrated with the arrows shown in FIG. 7b.

Figure 8:
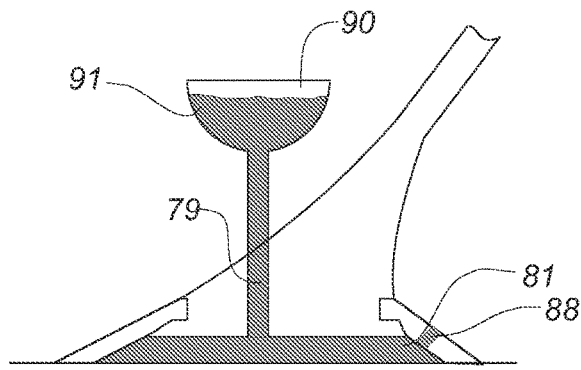

FIG. 8 illustrates a step in a method of attaching a surface mounted device to the surface of a wind turbine blade according to the invention. The method comprises a first step of providing the wind turbine blade and a second step of providing the surface mounted device with an attachment part according to the invention, e.g. one of the two embodiments shown in FIGS. 6a and 6b. In a third step, the attachment part of the surface mounted device is positioned on a first discrete area of the surface of the blade so that a cavity is formed between at least the housing and the surface of the wind turbine blade. In a fourth step, illustrated in FIG. 8, an adhesive or resin 91 is filled into the glue cavity. Once the glue cavity 81 has been filled with the adhesive, injection is stopped after which the adhesive 91 in a fifth step is cured or hardened so that the surface mounted device 70 is attached to the surface of the wind turbine blade via an adhesive bonding.

The adhesive 91 is injected into the glue cavity 81 via the bore 79, e.g. via a syringe or a static mixer. The ventilation hole 88 is preferably located at a proximal part of the flexible housing, such that adhesive 91 filled into the cavity 81 reaches said ventilation hole 88 last. Thereby, the ventilation hole 88 may also be used for visual inspection to check if the cavity has been filled. Alternatively or additionally, the flexible housing may be made in an at least partially transparent material, such that the filling process can be monitored.

The cavity 81 may remain connected to an adhesive reservoir 90 or chamber during the curing or hardening in the fifth step. Thus, if the adhesive 91 shrinks during the hardening, additional liquid adhesive will be drawn into the cavity and filling the voids. The adhesive 91 of the reservoir 90 should of course harden at a later stage than the adhesive in the cavity such that liquid adhesive is not drawn in the wrong direction.

The adhesive 90 may for instance be PU-based, epoxy-based or MMA. It may also be a hybrid between the various materials, such as a polymerisable PU mixed in a MMA.

In another embodiment, a micro-environment treatment is carried out in the cavity prior to the fourth step. The micro-environment treatment may for instance be chosen from the group of evacuating the cavity, heating the cavity, or a degasification, e.g. via filling the cavity with nitrogen. Thereby, the cavity may be dried before the injection step, which may improve the adhesive bond even further, since moist is removed prior to the injection. This may be carried out via attaching the appropriate tool to the bore 79 or the ventilation hole 88.

As shown in FIGS. 2 and 4, the surface mounted devices are advantageously flow guiding devices e.g. in form of spoiler devices, which are grouped together to form a flow guiding device group. The modular construction of this group makes the construction more flexible and reduces peel forces at the ends of the flow guiding device parts. The individual flow guiding device parts are preferably arranged such that the lengthwise directions of the parts are oriented substantially in the longitudinal direction of the blade.

Figure 9:
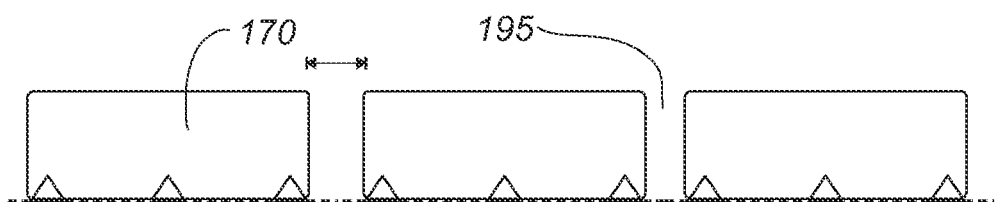
FIG. 9 shows a group of flow guiding devices.

FIG. 9 shows a back view of a first embodiment of a flow guiding device group. As can be seen, the group comprises a number of individual flow guiding device parts 170, which mutually are separated by gaps 181. The gaps 181 between adjacent flow guiding device parts 170 may for instance be between 5 mm and 30 mm. According to another embodiment (not shown), the flow guiding device parts abut each other.

Figure 10:
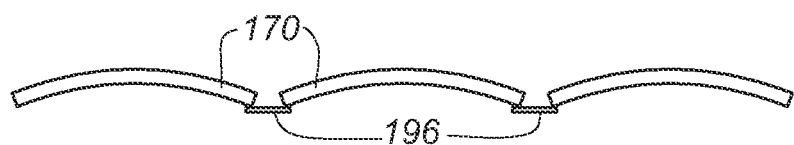
FIG. 10 shows a first embodiment of top parts of a group of flow guiding devices.

FIG. 10 shows the flow guiding device parts 170 seen from the top, here depicted as a proximal part of a plate-shaped element. In the shown embodiment, the gaps 181 between adjacent flow guiding device parts 170 are closed by intermediate elements 196 made of a flexible material, such as rubber. In this particular embodiment, the intermediate elements 179 are attached to a front surface of the plate-shaped elements 170. This may provide a continuous front surface for the flow guiding device group. However, according to a preferred embodiment, the design does not comprise any intermediate elements (corresponding to the embodiment shown in FIG. 9).

Figure 11:
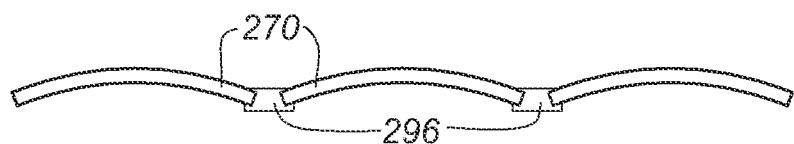
FIG. 11 shows a second embodiment of top parts of a group of flow guiding devices.

FIG. 11 shows a second embodiment of flow guiding device parts 270 according to the invention. In this embodiment the gaps are also closed by intermediate elements 296 made of a flexible material, such as rubber. In this embodiment, the intermediate parts fill the entire gap between the flow guiding device parts 270 and are attached to both a front surface and back surface of the flow guiding device parts 270.

Figure 12:
FIG. 12 shows a third embodiment of top parts of a group of flow guiding devices.

FIG. 12 shows a schematic view of a third embodiment of flow guiding device parts 370 according to the invention, seen from the top. In this embodiment, the flow guiding device parts are alternately arranged in front of and behind other flow guiding device parts, such that the flow guiding device parts form a nearly continuous front surface.

Figure 13:
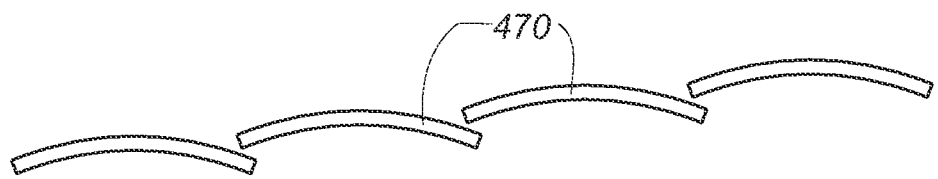
FIG. 13 shows a fourth embodiment of top parts of a group of flow guiding devices.

FIG. 13 shows a schematic view of a fourth embodiment of flow guiding device parts 470 according to the invention, seen from the top. It can be seen the flow guiding device parts 470 are staggered in the longitudinal direction. The back surface of one flow guiding device part may abut the front surface of a second flow guiding device part, or there may be a small gap in the transverse direction of the blade.

Figure 14:
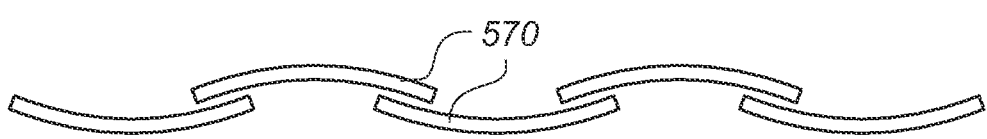
FIG. 14 shows a fifth embodiment of top parts of a group of flow guiding devices.

FIG. 14 shows a schematic view of a fifth embodiment of flow guiding device parts 570 according to the invention, seen from the top, which is similar to the third embodiment with the exception that the flow guiding device parts 570 are alternately convex and concave in the longitudinal direction. In the shown embodiment, two flow guiding device parts are arranged behind the others. However, they may also advantageously be arranged in front of the other flow guiding device parts, thereby obtaining a slightly different overall design. If the flow guiding device parts are angled forwards to form a pocket between the plate-shaped element and the blade surface, it is clear that two different types of flow guiding device parts are needed.

The invention has so far been described in relation to surface mounted devices in form of spoiler devices. However, the attachment parts and method according to the method may also be used for attaching other types of flow guiding devices to the surface of a wind turbine blade, e.g. serrated trailing edge panels or Gurney flaps.

Figure 15:
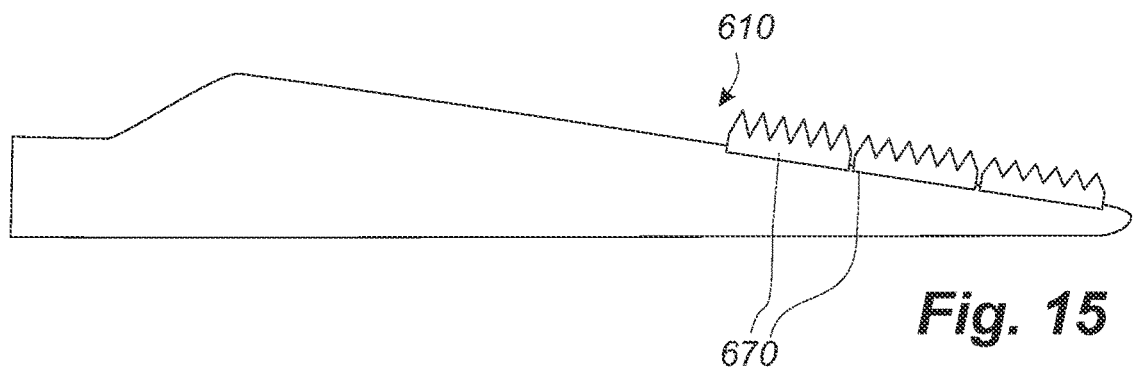
FIG. 15 shows a top view of a wind turbine blade provided with serrated trailing edge panels.
Figure 16:
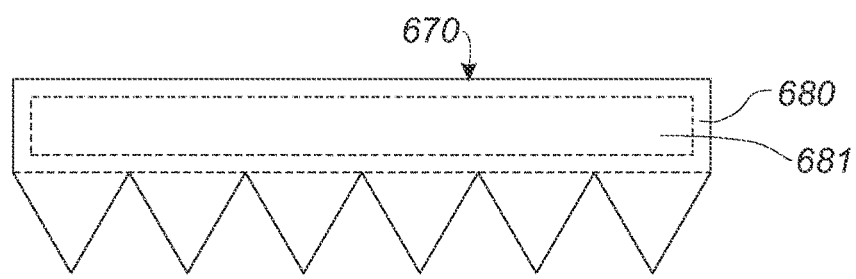
FIG. 16 shows a top view of a serrated trailing edge panel provided with an attachment part according to the invention.

FIG. 15 shows such an embodiment of a wind turbine blade 610, which is provided with a plurality of serrated trailing edge panels 670, which are arranged at the trailing edge of the blade near the blade tip. As seen in FIG. 16, the serrated trailing edge panel 670 may be provided with an attachment part, which comprises a flexible housing 681, which forms a glue cavity 681 between the panel 670 and the blade surface. The panel 670 is adhesively attached to the blade by filling the glue cavity with an adhesive and letting the adhesive cure or harden.

Figure 17:
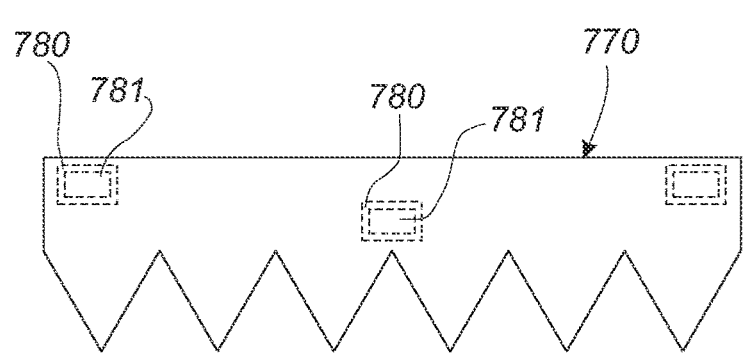
FIG. 17 shows a top view of a serrated trailing edge panel provided with three attachment parts according to the invention.

FIG. 17 shows an alternative embodiment of a serrated trailing edge panel 770, which is provided with three attachment parts, each comprising a flexible housing 780 and forming a glue cavity 681 between the panel 770 and the blade surface. The three attachment parts may, seen in a top view, be arranged in a triangle.

In the above embodiments, the flexible housing is described as a pre-manufactured element. However, the attachment part or the flexible housing is made from a double-adhesive tape or the like. In the following, such embodiments are exemplified for the attachment of a serrated trailing edge panel. However, the flexible housing made of double-adhesive tape may be used for any surface mounted device, such as spoiler devices or the like.

Figure 18:
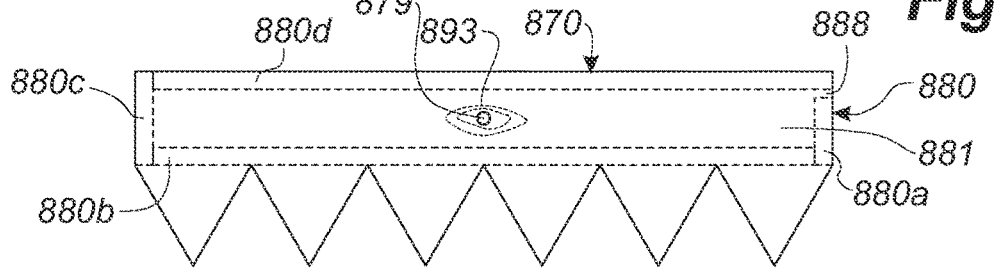
FIG. 18 shows a top view of a first embodiment of a serrated trailing edge panel, where the attachment part is made from double-adhesive tape.

FIG. 18 shows a top view of a first embodiment of a serrated trailing edge panel 870, where the flexible housing 880 of an attachment part is made from double-adhesive tape. The double-adhesive tape may be applied to the surface of the wind turbine blade (not shown) as separate parts 880a, 880b, 880c, 880d, which are arranged so that they form a circumferential part. Once the serrated trailing edge panel 870 is arranged on top of the double-adhesive tape, a cavity 881 is formed between the surface of the wind turbine blade, the double-adhesive tape and the serrated trailing edge panel 870. Liquid adhesive may then be injected into the cavity 881, e.g. via a bore 879 in the serrated trailing edge panel 879, and the adhesive propagates (illustrated with contour lines 893) through the cavity 881.

The double-adhesive tape parts 880a, 880b, 880c, 880d may be arranged so that a small opening 888 is provided in the circumferential part, such that a visual confirmation of the filling process may be provided, e.g. when liquid adhesive starts pouring out from the hole, the injection of the adhesive may be stopped.

Figure 19:
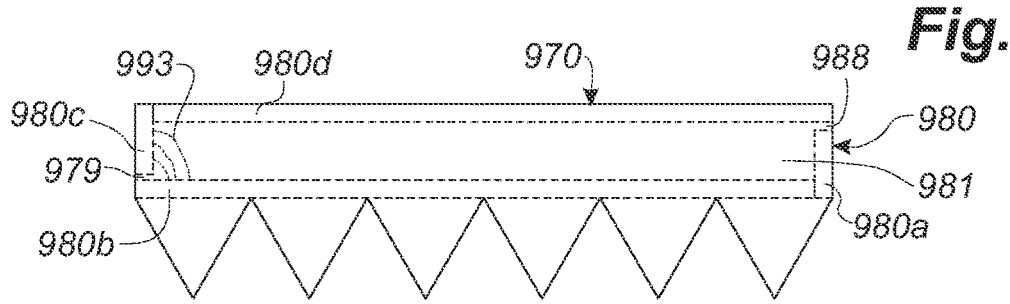
FIG. 19 shows a top view of a second embodiment of a serrated trailing edge panel, where the attachment part is made from double-adhesive tape.
Figure 20:
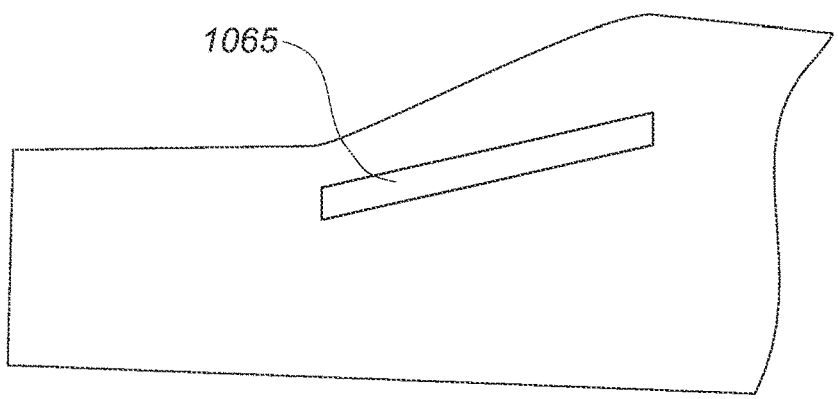
FIG. 20 shows a top view of a part of a blade with an area prepared for arrangement of surface mounted devices.

FIG. 19 shows a top view of a second embodiment of a serrated trailing edge panel, where the attachment part is made from double-adhesive tape. The double-adhesive tape may be applied to the surface of the wind turbine blade (not shown) as separate parts 980a, 980b, 980c, 980d, which are arranged so that they form a circumferential part. Once the serrated trailing edge panel 970 is arranged on top of the double-adhesive tape, a cavity 981 is formed between the surface of the wind turbine blade, the double-adhesive tape and the serrated trailing edge panel 970. The double-adhesive tape parts 980a, 980b, 980c, 980d are arranged so that an opening 979 is provided in the circumferential part. Liquid adhesive may then be injected through said opening 979 illustrated with contour lines 993.

Liquid adhesive may then be injected into the cavity 881, e.g. via a bore 879 in the serrated trailing edge panel 879, and the adhesive propagates (illustrated with contour lines 893) through the cavity 881.

The double-adhesive tape parts 980a, 980b, 980c, 980d may additionally be arranged so that a second small opening 988 is provided in an opposite side of the circumferential part, such that a visual confirmation of the filling process may be provided, e.g. when liquid adhesive starts pouring out from the hole, the injection of the adhesive may be stopped.

In one advantageous embodiment, the double-adhesive tape comprises a layer of compressible material. This provides a viscoelastic housing. The compressible material may for instance be a layer of foam cells, such as acrylic foam. The double-adhesive tape may have a thickness of at least 0.5 mm, and preferably at least 1 mm. Accordingly, a cavity having a height of e.g. 1 mm to 5 mm may be provided.

FIGS. 20-23 illustrate various steps in another embodiment for attach surface mounted devices, such as spoiler parts, to the surface of a wind turbine blade. While it according to the invention is not strictly necessary to remove the gelcoat for providing a proper bonding for the attachment parts, this may in some circumstances improve the bonding. In a first step shown in FIG. 20, an area 1065 on the surface of the blade may be prepared for arrangement and mounting of surface mounted devices. This may be carried out by removing the gelcoat in the area 1065. Alternatively, the blade shell may be manufactured with an area void of gelcoat.

Figure 21:
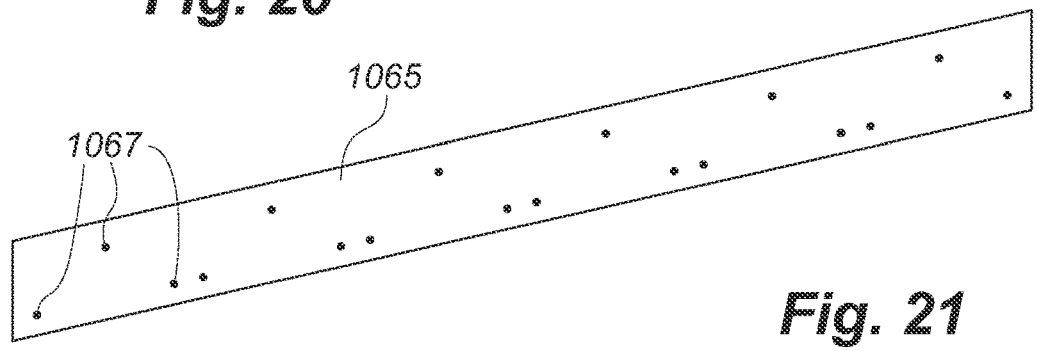
FIG. 21 shows a template for drilling alignment holes in the area prepared for arrangement of surface mounted devices.

In a next step illustrated in FIG. 21, a template for drilling alignment holes 1067 is arranged in the area 1065 prepared for arrangement of the surface mounted devices.

Figure 22:
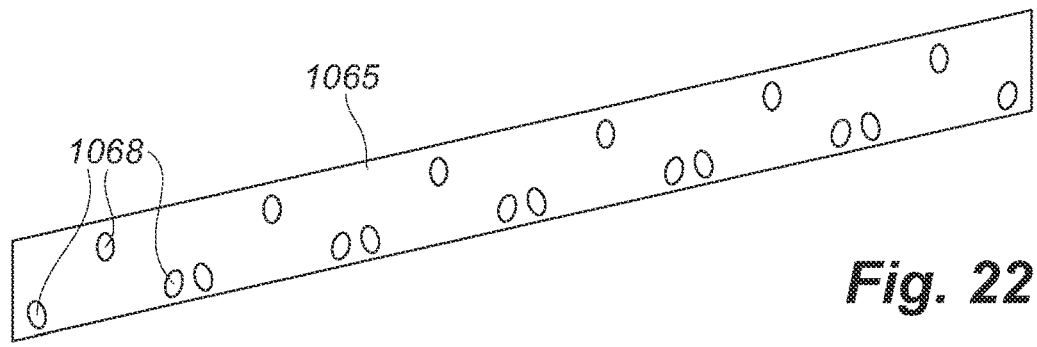
FIG. 22 shows areas prepared for mounting of the attachment parts of the surface mounted devices.

In a next step illustrated in FIG. 22, a plurality of patches 1068 are aligned on top of the alignment holes 1067. The patches 1068 may be provided with a pin for arrangement in the alignment holes. The patches 1068 may be arranged by use of a special tool, which has pre-aligned the orientation of the patches 1068.

In a next step, not illustrated, a gelcoat is applied to the prepared area 1065 and on top of the patches 1068. After the gelcoat has cured, the patches 1068 may be removed, thereby leaving a plurality of areas without gelcoat on the surface of the wind turbine blade.

In a next step, not illustrated, the surface mounted devices are arranged such that the flexible housing and attachment part is arranged on top of the gelcoat-free areas 1068.

The attachment part of the surface mounted devices may be mechanically fixed to the surface of the blade by use of screw attached through the attachment part and screwed into the alignment holes 1067 on the surface of the blade.

Figure 23:
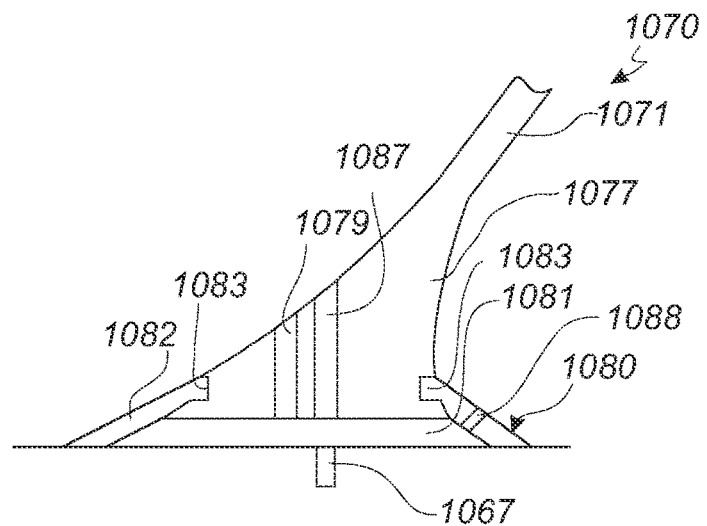
FIG. 23 shows an additional embodiment of a proximal part of a flow guiding device according to the invention with an attachment part according to the invention.

Such an embodiment is shown in FIG. 23, wherein like reference numeral refer to like parts of the embodiments shown in FIGS. 6a and 6b. Therefore, only the difference between the embodiment in FIG. 23 and FIG. 6a is described. The embodiment differs in having a bore 1087 for a screw, and the attachment part is preliminary attached to the surface of the blade via a screw (not shown) inserted through the bore 1087 and screwed into the alignment holes 1067 formed in the surface of the blade. The alignment holes e.g. have a depth of 20 mm.

After the adhesive has been injected into the cavity 1081 and cured, the screw may be removed. The remaining hole may then be filled with a sealant.

The invention has been described with reference to a preferred embodiment. However, the scope of the invention is not limited to the illustrated embodiment, and alterations and modifications can be carried out without deviating from the scope of the invention.

| List of reference numerals | |
|---|---|
| 2 | wind turbine |
| 4 | tower |
| 6 | nacelle |
| 8 | hub |
| 10, 610 | blade |
| 14 | blade tip |
| 16 | blade root |
| 18 | leading edge |
| 20 | trailing edge |
| 22 | pitch axis |
| 30 | root region |
| 32 | transition region |
| 34 | airfoil region |
| 36 | pressure side shell |

-continued

| List of reference numerals | |
|---|---|
| 38 | suction side shell |
| 40, 42, 50 | Profiled contour |
| 52 | Pressure side |
| 54 | Suction side |
| 56 | Leading edge |
| 58 | Trailing edge |
| 60 | Chord |
| 62 | Camber line/median line |
| 1065 | Area prepared for mounting of surface mounted devices |
| 1067 | Template for alignment holes |
| 1068 | Pads/gel-coat free areas |
| 70, 70', 170, 270, 370, 470, 570, 670, 770, 870, 970, 1070 | Surface mounted device/flow guiding device |
| 71, 71', 1071 | Plate-shaped element |
| 72 | Front surface |
| 73 | Rear surface |
| 74 | Proximal/lower part of surface mounted device |
| 75 | Distal/upper part of surface mounted device |
| 76 | Grid/rib structure |
| 77, 77' | Attachment part |
| 78 | Grip |
| 79, 79', 879, 979, 1079 | Bore/hole/opening |
| 80, 80', 680, 780, 880, 980, 1080, | Flexible housing |
| 81, 81', 681, 781, 881, 981, 1081 | Glue cavity |
| 82, 82', 182, 1082 | Circumferential lip |
| 83, 83', 1083 | Recess |
| 84, 184 | Attachment surface |
| 85, 185 | Double adhesive tape |
| 86, 186 | Liner |
| 1087 | Bore for screw |
| 88 | Ventilation bore/hole |
| 91 | Reservoir |
| 893, 993 | Propagation front |
| 92 | Adhesive |
| 95 | Flow guiding device group |
| 196, 296 | Intermediate elements |
| c | Chord length |
| $d_t$ | position of maximum thickness |
| $d_f$ | position of maximum camber |
| $d_p$ | position of maximum pressure side camber |
| f | camber |
| r | local radius, radial distance from blade root |
| t | thickness |

The invention claimed is:

1. A wind turbine blade (10, 610) for a rotor of a wind turbine (2) having a substantially horizontal rotor shaft, said rotor comprising a hub (8), from which the wind turbine blade (10, 610) extends substantially in a radial direction when mounted to the hub (8), the wind turbine blade (10, 610) having a longitudinal direction (r) with a tip end (14) and a root end (16) and a transverse direction, the wind turbine blade (10) further comprising:

a profiled contour (40, 42, 50) including a pressure side and a suction side, as well as a leading edge (18) and a trailing edge (20) with a chord having a chord length extending there between, the profiled contour, when being impacted by an incident air-flow, generating a lift, wherein a surface mounted device (70, 70', 170, 270, 370, 470, 570, 670, 770) is attached to a surface of the wind turbine blade (10), wherein the surface mounted device (70, 70', 170, 270, 370, 470, 570, 670, 770) is attached to the surface of the wind turbine blade (10, 610) via at least a first attachment part (77, 77'), which is connected to a part of the surface mounted device (70, 70', 170, 270, 370, 470, 570, 670, 770), wherein the attachment part (77, 77') comprises a flexible housing (80, 80', 680, 780) that forms a cavity (81, 81', 681, 781) between at least the housing (80, 80', 680, 780) and the surface of the wind turbine blade (10, 610), and wherein the cavity (80, 80', 680, 780) is filled with an adhesive that provides an adhesive bonding to the surface of the wind turbine blade (10, 610).

2. The wind turbine blade according to claim 1, wherein the flexible housing is made of a first material and the surface mounted device made of a second material, wherein a hardness of the first material is smaller than the hardness of the second material.

3. The wind turbine blade according to claim 1, wherein the flexible housing is made of an elastomer material.

4. The wind turbine blade according to claim 1, wherein the attachment part is tapered from a proximal part to a distal part of the attachment part, e.g. being bell-shaped, conical shaped, or frusto-conical shaped.

5. The wind turbine blade according to claim 1, wherein the surface mounted device is a flow guiding device, such as a spoiler device or a Gurney flap.

6. The wind turbine blade according to claim 1, wherein the surface mounted device comprises a plate-shaped element, which protrudes from the surface of the wind turbine blade.

7. The wind turbine blade according to claim 1, wherein the surface mounted device is arranged on the pressure side of the blade.

8. The wind turbine blade according to claim 1, wherein the surface mounted device is curved in a lengthwise direction of the device.

9. The wind turbine blade according to claim 8, wherein a lengthwise radius of curvature of the surface mounted device varies from a proximal part of the surface mounted device to a distal part of the surface mounted device, e.g., wherein the radius of curvature increases from the proximal part to the distal part of the surface mounted device, alternatively wherein the radius of curvature decreases from the proximal part to the distal part of the surface mounted device.

10. The wind turbine blade according to claim 1, wherein the surface mounted device is reinforced with a grid or rib structure.

11. The wind turbine blade according to claim 1, wherein the surface mounted device may be angled towards the leading edge of the blade so as to provide a pocket between the surface mounted device and the surface of the blade, said pocket facing towards the leading edge of the blade.

12. The wind turbine blade according to claim 1, wherein the flexible housing is made of a double-adhesive tape.

13. The wind turbine blade according to any claim 12, wherein the double-adhesive tape forms a circumferential part between the surface of the wind turbine blade and the sur-face mounted device, and which forms a cavity between the double-adhesive tape, the surface of the wind turbine blade and a part of the surface mounted device.

14. The wind turbine blade according to claim 12, wherein the double-adhesive tape comprises a layer of compressible material.

15. The wind turbine blade according to claim 14, wherein the compressible material is a layer of foam cells, such as acrylic foam.

16. The wind turbine blade according to claim 12, wherein the double-adhesive tape has a thickness of at least 0.5 mm, and preferably at least 1 mm.

17. The wind turbine blade according to claim 12, wherein the adhesive tape has a thickness of maximum 10 mm, or maximum 7 mm, or maximum 5 mm.

18. A flow guiding device, which is adapted to be attached to the surface of a wind turbine blade, via at least a first attachment part, wherein the attachment part comprises a flexible housing that is adapted to form a cavity between at least the housing and the surface of the wind turbine blade, the cavity being adapted to be filled with an adhesive that provides an adhesive bonding to the surface of the wind turbine blade.

19. A wind turbine blade for a rotor of a wind turbine having a substantially horizontal rotor shaft, said rotor comprising a hub, from which the wind turbine blade extends substantially in a radial direction when mounted to the hub, the wind turbine blade having a longitudinal direction with a tip end and a root end and a transverse direction, the wind turbine blade further comprising:
  a profiled contour including a pressure side and a suction side, as well as a leading edge and a trailing edge with a chord having a chord length extending there between, the profiled contour, when being impacted by an incident airflow, generating a lift, wherein
  a surface mounted device is attached to a surface of the wind turbine blade, wherein
  the surface mounted device is attached to the surface of the wind turbine blade via at least a first attachment part, which is connected to a part of the surface mounted device, wherein
  the attachment part comprises a flexible housing made of a double-adhesive tape that forms a cavity between at least the housing, the surface of the wind turbine blade, and a part of the surface mounted device, and wherein
  the cavity is filled with an adhesive that provides an adhesive bonding to the sur-face of the wind turbine blade.

20. The wind turbine blade according to claim 19, wherein the double-adhesive tape comprises a layer of compressible material.

21. The wind turbine blade according to claim 20, wherein the compressible material is a layer of foam cells, such as acrylic foam.

22. The wind turbine blade according to claim 19, wherein the double-adhesive tape has a thickness of at least 0.5 mm, and preferably at least 1 mm.

23. The wind turbine blade according to claim 19, wherein the adhesive tape has a thickness of maximum 10 mm, or maximum 7 mm, or maximum 5 mm.

* * * * *